(12) United States Patent
Mizuno

(10) Patent No.: US 7,625,118 B2
(45) Date of Patent: Dec. 1, 2009

(54) CIRCUIT FOR CORRECTING SENSOR TEMPERATURE CHARACTERISTICS

(75) Inventor: Nobuyasu Mizuno, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 244 days.

(21) Appl. No.: 11/902,798

(22) Filed: Sep. 25, 2007

(65) Prior Publication Data

US 2008/0074192 A1 Mar. 27, 2008

(30) Foreign Application Priority Data

Sep. 25, 2006 (JP) ............................. 2006-258610
Aug. 16, 2007 (JP) ............................. 2007-212402

(51) Int. Cl.
*G01K 3/00* (2006.01)
(52) U.S. Cl. ...................... 374/111; 374/112
(58) Field of Classification Search ..................... 374/1, 374/172, 112, 111
See application file for complete search history.

(56) References Cited

U.S. PATENT DOCUMENTS 7,033,071 B2 * 4/2006 Otsuka ........................ 374/142
7,364,353 B2 * 4/2008 Kolk ............................... 374/1
2009/0161726 A1 * 6/2009 Miyamoto et al. .......... 374/172

FOREIGN PATENT DOCUMENTS

JP 06-307945 A 11/1994

* cited by examiner

*Primary Examiner*—Andre J Allen
(74) *Attorney, Agent, or Firm*—Arent Fox LLP

(57) ABSTRACT

A temperature characteristic correction circuit that improves the temperature characteristic correction accuracy by smoothly changing the gradient of an adjustment voltage without using a comparator. The temperature characteristic correction circuit for correcting the temperature characteristic of a signal includes a plurality of correction signal generation units for generating a plurality of correction signals characterized by different temperature to voltage change rates. The temperature characteristic correction circuit generates the correction signals having the lowest voltage or the highest voltage as an adjustment signal at a given temperature by the one of the plurality of correction signal generation units, and corrects the temperature characteristic of the signal with the adjustment signal.

20 Claims, 16 Drawing Sheets ions No.
CIRCUIT FOR CORRECTING SENSOR TEMPERATURE CHARACTERISTICS

CROSS-REFERENCE TO RELATED APPLICATIONS

This application is based upon and claims the benefit of priority from the prior Japanese Patent Applications No. 2006-258610, filed on Sep. 25, 2006, and No. 2007-212402, filed on Aug. 16, 2007, the entire contents of which are incorporated herein by reference.

BACKGROUND

1. Field

It is related to a temperature characteristic correction circuit and a sensor amplification circuit.

2. Description of the Related Art

Miniaturization of sensors has resulted in a generation of finer output signals. Amplification circuits for detecting and amplifying such sensor outputs are widely used. An output signal from a sensor has temperature characteristics. Thus, an amplification circuit for a sensor must correct the temperature characteristics of an output signal before amplifying the output signal. In addition to parameters that just increase or decrease, temperature characteristics of the sensor includes parameters having voltage variation gradients that change in accordance with the temperature.

FIG. 1A is a schematic block circuit diagram of an amplification circuit 90 that includes a conventional temperature characteristic correction circuit 80. When an output signal Vs of a sensor (not shown) has a predetermined gradient (e.g., a V-shaped gradient as shown in FIG. 1B), the correction circuit 80 generates an adjustment signal Va (FIG. 1C) that offsets the gradient of the output signal Vs. The adjustment signal Va is provided to the sensor amplification circuit 90, which receives the output signal Vs. The amplification circuit 90 corrects the temperature characteristics of the output signal Vs using the adjustment signal Va and generates an amplified signal Vout (FIG. 1D).

The correction circuit 80 will now be described with reference to FIG. 2. The correction circuit 80 generates the adjustment signal Va having, for example, the V-shaped gradient shown in FIG. 1C.

As shown in FIG. 2, a correction amplifier 81 has two input terminals. One input terminal is provided with a temperature dependent signal Vt of which the voltage value is dependent on the temperature as shown in FIG. 3A. The other input terminal is provided with a reference signal Vref of which the voltage value is substantially the same regardless of temperature as shown in FIG. 3A. The correction amplifier 81 inverts the temperature dependent signal Vt based on the reference signal Vref and a gain that is in accordance with a resistor R11 and a feedback resistor R12 to generate a correction signal Vc. The temperature dependent signal Vt and the reference signal Vref are also provided to a comparator 82. The comparator 82 compares the temperature dependent signal Vt with the reference signal Vref and generates a selection signal SS for switching switches S1 and S2 based on the comparison result.

In detail, when the voltage value of the temperature dependent signal Vt is higher than the voltage value of the reference signal Vref (at temperatures lower than a switching temperature Ts indicated by a broken line in FIG. 3A), the comparator 82 provides the switches S1 and S2 with a high (H) level selection signal SS. The H level selection signal SS couples a first terminal a11 of the switch S1 to a common terminal c11 of the switch S1 and a first terminal a12 of the switch S2 to a common terminal c12 of the switch S2. As a result, the resistance of the feedback resistor R12 is set in accordance with a set value prestored in a register r1, which is coupled to the first terminal a11 of the switch S1. Further, the gain of the amplifier 81 is set to a predetermined value (e.g., 2). The amplifier 81 then inverts the temperature dependent signal Vt based on the reference signal Vref and the gain of 2 to generate a correction signal Vc (refer to the dashed line in FIG. 3B). The correction signal Vc is inverted by an inverter 83. The inverted signal is then provided to the sensor amplification circuit 90 as an adjustment signal Va (refer to the solid line in FIG. 3B).

When the voltage value of the temperature dependent signal Vt is lower than the voltage value of the reference signal Vref (at temperatures higher than the switching temperature Ts), the comparator 82 provides the switches S1 and S2 with a low (L) level selection signal SS. The L level selection signal SS couples a second terminal b11 of the switch S1 to the common terminal c11 and a second terminal b12 of the switch S2 to the common terminal c12. As a result, the resistance of the feedback resistor R12 is set in accordance with a set value prestored in a register r2, which is coupled to the second terminal b11 of the switch S1. This changes the gain of the amplifier 81 to another value (e.g., 1). The amplifier 81 then inverts the temperature dependent signal Vt based on the reference signal Vref and the gain of 1 to generate a correction signal Vc (refer to the double-dashed line in FIG. 3B). The correction signal Vc is directly provided from the correction circuit 80 to the sensor amplification circuit 90 as an adjustment signal Va (refer to a solid line in FIG. 3B). In this manner, the temperature characteristic correction circuit 80 generates the V-shaped adjustment signal Va that has different gradients at low temperatures and high temperatures.

Such a temperature characteristic correction circuit and sensor amplification circuit are described in Japanese Laid-Open Patent Publication No. 6-307945.

The temperature characteristic correction circuit 80 switches the switches S1 and S2, or the gradient of the adjustment signal Va, with the comparator 82. More specifically, the temperature characteristic correction circuit 80 switches the gradient of the adjustment signal Va based on the comparison of the temperature dependent signal Vt and the reference signal Vref performed by the comparator 82. However, the comparator 82 is known to repeatedly generate H level outputs and L level outputs when high-frequency noise enters the comparator 82 at temperatures that are close to the switching temperature Ts. To prevent the occurrence of a phenomenon similar to oscillation in the comparator 82, the comparator 82 is provided with hysteresis characteristics. However, as shown in FIG. 3B, when the comparator 82 is provided with hysteresis characteristics, the switching point of the gradient of the adjustment signal Va becomes deviated from the switching temperature Ts by an amount corresponding to the hysteresis width H. This forms a step that interrupts the continuity of the adjustment signal. As a result, the sensitivity of the comparator is lowered by a degree corresponding to the hysteresis width H, and the correction accuracy of the temperature characteristics decreases accordingly.

SUMMARY

The embodiment provides a temperature characteristic correction circuit and sensor amplification circuit that smoothes the gradient of an adjustment voltage and improves the correction accuracy of temperature characteristics without using a comparator.

The embodiment provides that a temperature characteristic correction circuit correcting a temperature characteristic of a signal, the temperature characteristic correction circuit including a plurality of correction signal generation units generating a plurality of correction signals characterized by different temperature to voltage change rates, wherein the plurality of correction signals having the lowest voltage or the one of the plurality of correction signals having the highest voltage is generated as an adjustment signal correcting the temperature characteristic of the signal at a given temperature by the one of the plurality of correction signal generation units.

BRIEF DESCRIPTION OF THE DRAWINGS

The objects and advantages may best be understood by reference to the following description of the presently preferred embodiments together with the accompanying drawings in which.

DETAILED DESCRIPTION OF THE PREFERRED EMBODIMENTS

Figure 1A:
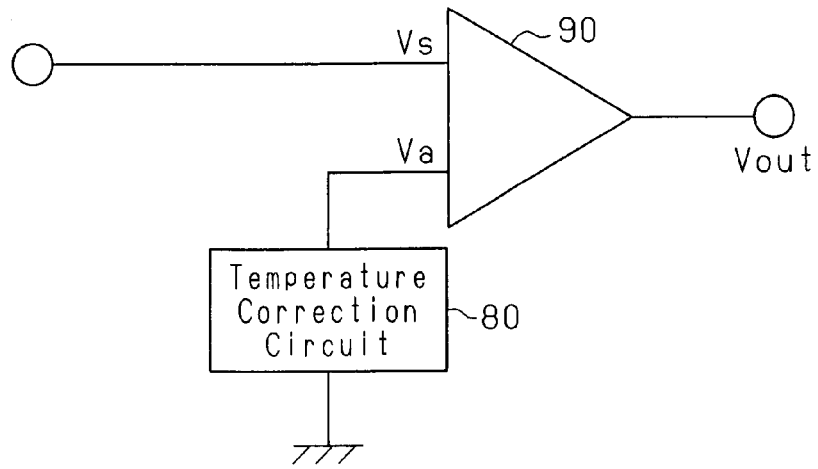
FIG. 1A is a schematic block circuit diagram of a sensor amplification circuit that includes a conventional temperature characteristic correction circuit.

In the drawings, like numerals are used for like elements throughout.

A temperature characteristic correction circuit 1 according to one embodiment will now be described with reference to FIGS. 4 to 7.

Figure 4:
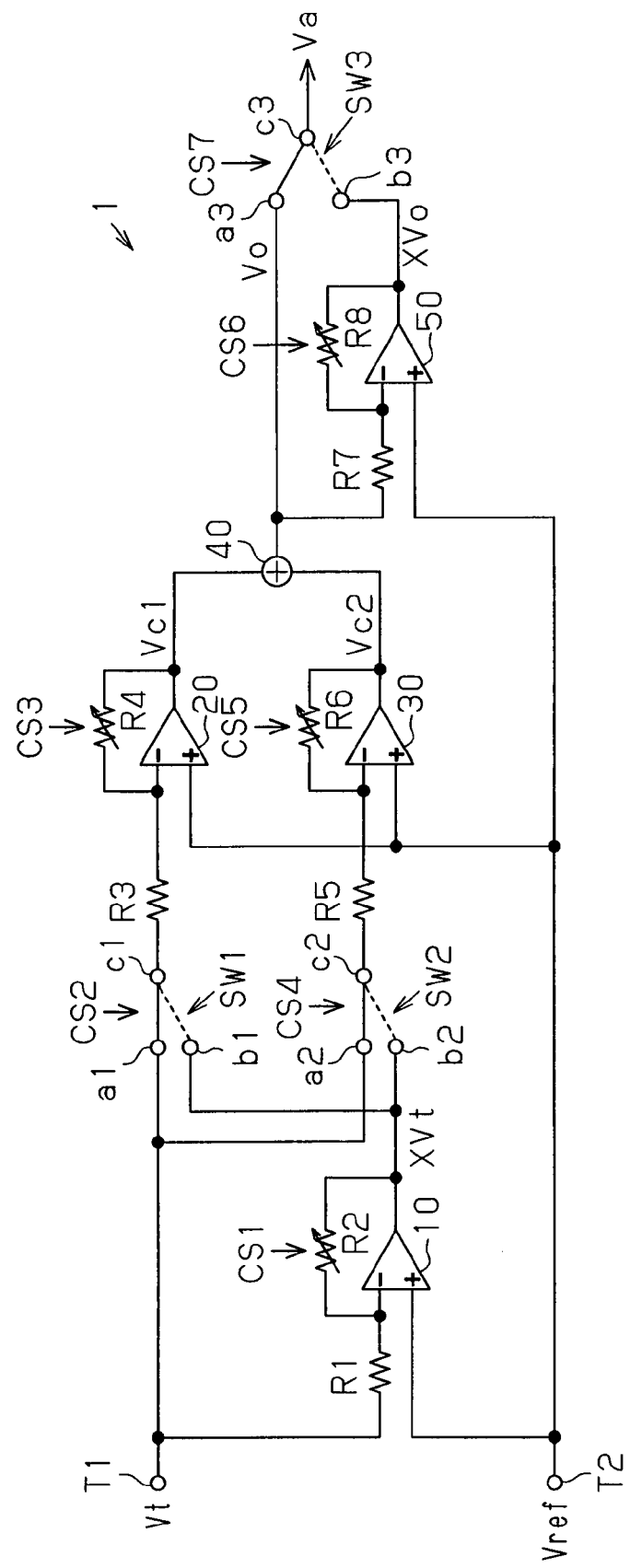
FIG. 4 is a schematic circuit diagram of a temperature characteristic correction circuit according to one embodiment.
Figure 5:
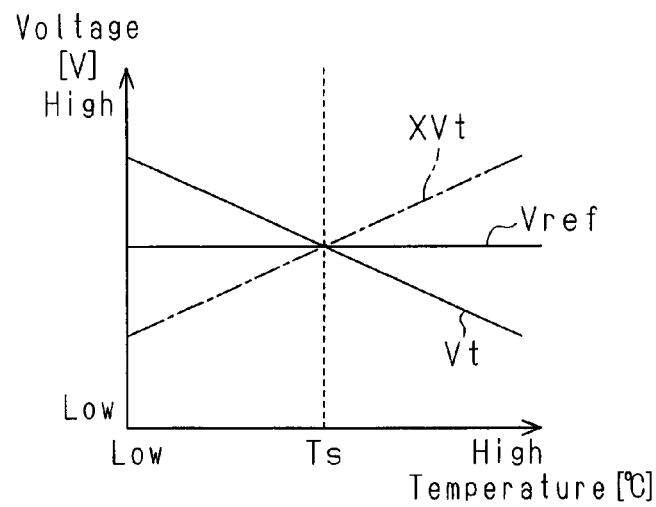
FIG. 5 is a graph showing the temperature to voltage characteristics of a temperature dependent signal and a reference signal shown in FIG. 4.

As shown in FIG. 4, the temperature characteristic correction circuit 1 has input terminals T1 and T2. The input terminal T1 is provided with a temperature dependent signal Vt of which the voltage value is dependent on the temperature (refer to FIG. 5). The input terminal T2 is provided with a reference signal Vref of which the voltage value is substantially the same regardless of the temperature (refer to FIG. 5). The temperature dependent signal Vt is generated using a forward voltage at a PN junction of a transistor or a diode. As shown in FIG. 5, the temperature dependent signal Vt has a temperature characteristic in which the voltage value of the temperature dependent signal Vt changes linearly relative to the temperature at a gradient of, for example, $-2$ mV/$^\circ$ C. The reference signal Vref is, for example, a bandgap reference voltage. In detail, the voltage value of the temperature dependent signal Vt is higher than the voltage value of the reference signal Vref at temperatures lower than a switching temperature Ts (refer to the broken line in FIG. 5). The voltage value of the temperature dependent signal Vt is lower than the voltage value of the reference signal Vref at temperatures higher than the switching temperature Ts. At the switching temperature Ts, the voltage values of the temperature dependent signal Vt and the reference signal Vref are substantially equal to each other.

As shown in FIG. 4, the temperature dependent signal Vt is provided to a first terminal a1 of a switch SW1 and a first terminal a2 of a switch SW2. The temperature dependent signal Vt is also provided to an inversion input terminal of an amplifier 10 via a resistor R1. The reference signal Vref is provided to a non-inversion input terminal of the amplifier 10.

The amplifier 10 inverts the temperature dependent signal Vt based on the reference signal Vref and the gain determined by the resistor R1 and a feedback resistor R2 to generate an inverted signal XVt (refer to the dashed line in FIG. 5). The inverted signal XVt is provided to a second terminal b1 of the switch SW1 and a second terminal b2 of the switch SW2. The amplifier 10, the resistor R1, and the feedback resistor R2 form an inversion amplification circuit. The feedback resistor R2 is formed by a variable resistor. The resistance of the feedback resistor R2 is adjusted by a control signal CS1, which is provided from a controller (not shown) based on a sensor output signal Vs (refer to FIG. 1B). The resistance of the feedback resistor R2 is adjusted to adjust the gain of the inversion amplification circuit (amplifier 10). In the one embodiment, the resistance of the feedback resistor R2 is set so that the gain of the inversion amplification circuit (amplifier 10) is adjusted to, for example, 1.

The switch SW1 has the first and second terminals a1 and b1 and a common terminal c1. The first terminal a1 is coupled to the input terminal T1. The second terminal b1 is coupled to an output terminal of the amplifier 10. The common terminal c1 is coupled to an inversion input terminal of a correction amplifier 20 via a resistor R3. Thus, when the first terminal a1 and the common terminal c1 are coupled to each other (refer to the solid line of the switch SW1 in FIG. 4), the inversion input terminal of the correction amplifier 20 is provided with the temperature dependent signal Vt. When the second terminal b1 and the common terminal c1 are coupled to each other (refer to the broken line in the switch SW1 in FIG. 4), the inversion input terminal of the correction amplifier 20 is provided with the inverted signal XVt. The switch SW1 is switched based on a control signal CS2, which is provided from the controller (not shown) based on the temperature characteristics of the sensor output signal Vs.

The input terminal T2 is coupled to a non-inversion input terminal of the correction amplifier 20, and the non-inversion input terminal of the correction amplifier 20 is provided with the reference signal Vref. The correction amplifier 20 selectively inverts the temperature dependent signal Vt and the inverted signal XVt based on the reference signal Vref and the gain determined by the resistor R3 and a feedback resistor R4 to generate a first correction signal Vc1. The first correction signal Vc1, which is generated by the correction amplifier 20, is provided to an OR circuit 40. The feedback resistor R4 is formed by a variable resistor. The resistance of the feedback resistor R4 is adjusted by a control signal CS3, which is provided from the controller (not shown) based on the temperature characteristics of the sensor output signal Vs. The resistance of the feedback resistor R4 is adjusted to adjust the gain of the correction amplifier 20. In the one embodiment, the resistance of the feedback resistor R4 is set so that the gain of the correction amplifier 20 is adjusted to, for example, 1. The correction amplifier 20 and the feedback resistor R4 form a correction signal generation unit.

The switch SW2 has the first and second terminals a2 and b2 and a common terminal c2. The first terminal a2 is coupled to the input terminal T1. The second terminal b2 is coupled to an output terminal of the amplifier 10. The common terminal c2 is coupled to an inversion input terminal of a correction amplifier 30 via a resistor R5. Thus, when the first terminal a2 and the common terminal c2 are coupled to each other (refer to the solid line in the switch SW2 in FIG. 4), the inversion input terminal of the correction amplifier 30 is provided with the temperature dependent signal Vt. When the second terminal b2 and the common terminal c2 are coupled to each other (refer to the broken line in the switch SW2 in FIG. 4), the inversion input terminal of the correction amplifier 30 is provided with the inverted signal XVt. The switch SW2 is switched by a control signal CS4, which is provided from the controller (not shown) based on the temperature characteristics of the sensor output signal Vs.

The input terminal T2 is coupled to a non-inversion input terminal of the correction amplifier 30, and the non-inversion input terminal of the correction amplifier 30 is provided with the reference signal Vref. The correction amplifier 30 selectively inverts the temperature dependent signal Vt and the inverted signal XVt based on the reference signal Vref and the gain determined by the resistor R5 and a feedback resistor R6 to generate a second correction signal Vc2. The second correction signal Vc2, which is generated by the correction amplifier 30, is provided to the OR circuit 40. The feedback resistor R6 is formed by a variable resistor. The resistance of the feedback resistor R6 is adjusted by a control signal CS5, which is provided from the controller (not shown) based on the temperature characteristics of the sensor output signal Vs. The resistance of the feedback resistor R6 is adjusted to adjust the gain of the correction amplifier 30. In the one embodiment, the resistance of the feedback resistor R6 is set so that the gain of the correction amplifier 30 is adjusted to, for example, 2. The correction amplifier 30 and the feedback resistor R6 form a correction signal generation unit.

FIGS. 6A to 6D show examples of combinations of the first correction signal Vc1 and second correction signal Vc2, which are provided to the OR circuit 40.

Figure 6A:
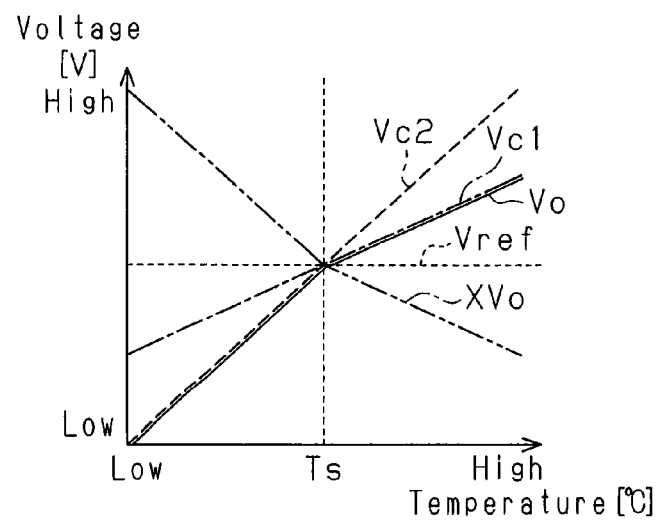
FIG. 6A is a graph showing the temperature to voltage characteristics of first and second correction signals and an output signal.

FIG. 6A shows the first and second correction signals Vc1 and Vc2 when the first terminal a1 and the common terminal c1 of the switch SW1 are coupled to each other and the first terminal a2 and the common terminal c2 of the switch SW2 are coupled to each other. When the first terminal a1 and the common terminal c1 of the switch SW1 are coupled to each other, the inversion input terminal of the correction amplifier 20 is provided with the temperature dependent signal Vt. The correction amplifier 20 inverts the temperature dependent signal Vt based on the reference signal Vref and the gain of 1 to generate the first correction signal Vc1. The graph of FIG. 6A shows the first correction signal Vc1 plotted along a plurality of values of the first correction voltage (Vc1) in a predetermined temperature range. The first correction signal Vc1 extends along a straight line having a first gradient. Thus, the voltage changes as the temperature changes in accordance with the first gradient. When the first terminal a2 and the common terminal c2 of the switch SW2 are coupled to each other, the inversion input terminal of the correction amplifier 30 is provided with the temperature dependent signal Vt. The correction amplifier 30 inverts the temperature dependent signal Vt based on the reference signal Vref and the gain of 2 to generate the second correction signal Vc2. The graph of FIG. 6A shows the second correction signal Vc2 plotted along a plurality of values of the second correction voltage (Vc2) in a predetermined temperature range. The second correction signal Vc2 extends along a straight line having a second gradient. Thus, the voltage changes as the temperature changes in accordance with the second gradient, which differs from the first gradient.

Figure 6B:
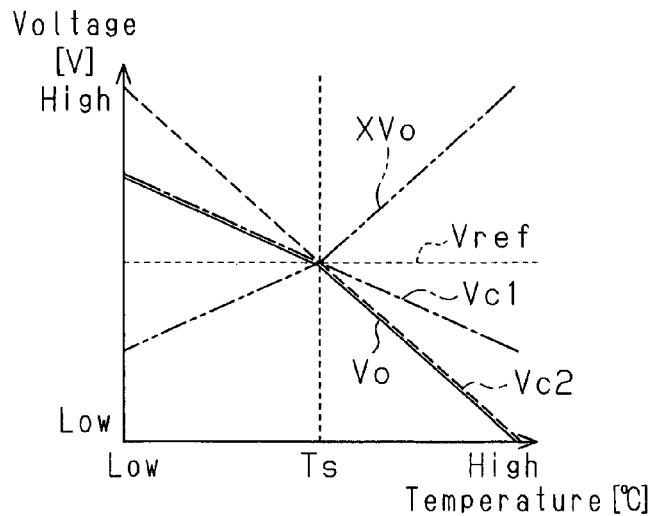
FIG. 6B is a graph showing the temperature to voltage characteristics of the first and second correction signals and the output signal.

FIG. 6B shows the first and second correction signals Vc1 and Vc2 when the second terminal b1 and the common terminal c1 of the switch SW1 are coupled to each other and the second terminal b2 and the common terminal c2 of the switch SW2 are coupled to each other. When the second terminal b1 and the common terminal c1 of the switch SW1 are coupled to each other, the inversion input terminal of the correction amplifier 20 is provided with the inverted signal XVt. The correction amplifier 20 inverts the inverted signal XVt based on the reference signal Vref and the gain of 1 to generate the first correction signal Vc1 shown in FIG. 6B. The graph of FIG. 6B shows the first correction signal Vc1 plotted along a plurality of values of the first correction voltage (Vc1) in a predetermined temperature range. The first correction signal Vc1 extends along a straight line. When the second terminal b2 and the common terminal c2 of the switch SW2 are coupled to each other, the inversion input terminal of the correction amplifier 30 is provided with the inverted signal XVt. The correction amplifier 30 inverts the inverted signal XVt based on the reference signal Vref and the gain of 2 to generate the second correction signal Vc2 shown in FIG. 6B. The graph FIG. 6B shows the second correction signal Vc2 plotted along a plurality of values of the second correction voltage (Vc2) in a predetermined temperature range. The second correction signal Vc2 extends along a straight line.

Figure 6C:
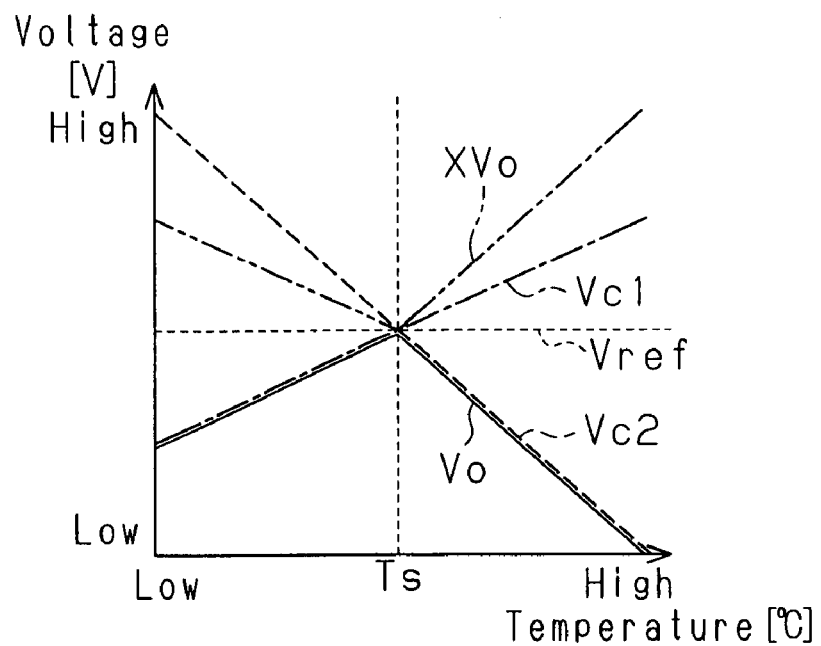
FIG. 6C is a graph showing the temperature to voltage characteristics of the first and second correction signals and the output signal.
Figure 6D:
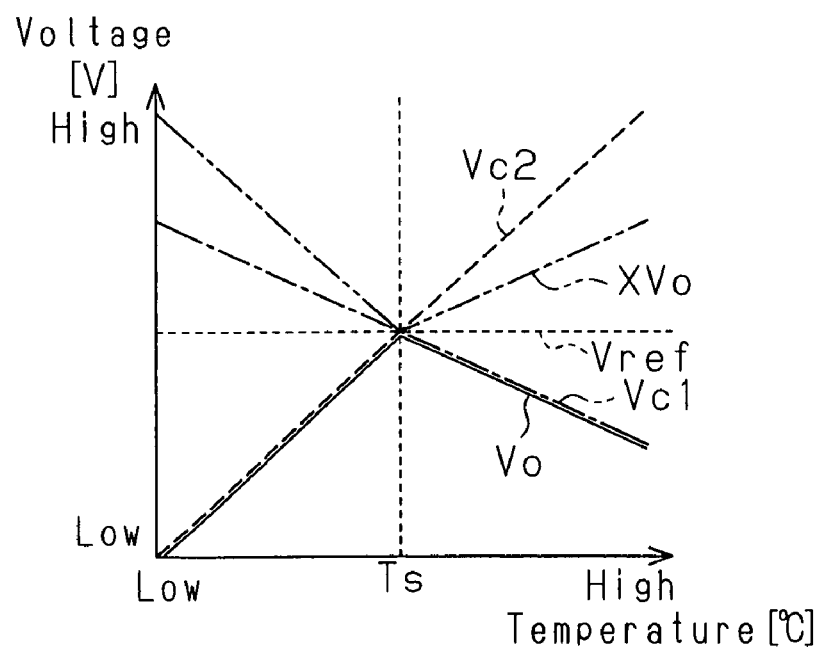
FIG. 6D is a graph showing the temperature to voltage characteristics of the first and second correction signals and the output signal.

FIG. 6C shows a state in which the first terminal 1a and the common terminal c1 of the switch SW1 are coupled to each other and the second terminal b2 and the common terminal c2 of the switch SW2 are coupled to each other. FIG. 6D shows a state in which the second terminal b1 and the common terminal c1 of the switch SW1 are coupled to each other and the first terminal a2 and the common terminal c2 of the switch SW2 are coupled to each other.

As shown in FIGS. 6A to 6D, the temperature characteristic correction circuit 1 generates the two correction signals Vc1 and Vc2 using the two correction amplifiers 20 and 30. The voltages changes relative to changes in the temperature at a gradient (rate) that differs between the correction signals Vc1 and Vc2. The temperature characteristic correction circuit 1 further provides the correction signals Vc1 and Vc2 to the OR circuit 40. The correction signals Vc1 and Vc2 are generated based on the same temperature dependent signal Vt and the same reference signal Vref. Thus, the relationship in terms of voltage level between the first correction signal Vc1 and the second correction signal Vc2 is reversed at the switching temperature Ts. The switching temperature Ts is the boundary at which the relationship of Vc1>Vc2 switches to Vc1<Vc2.

Figure 7:
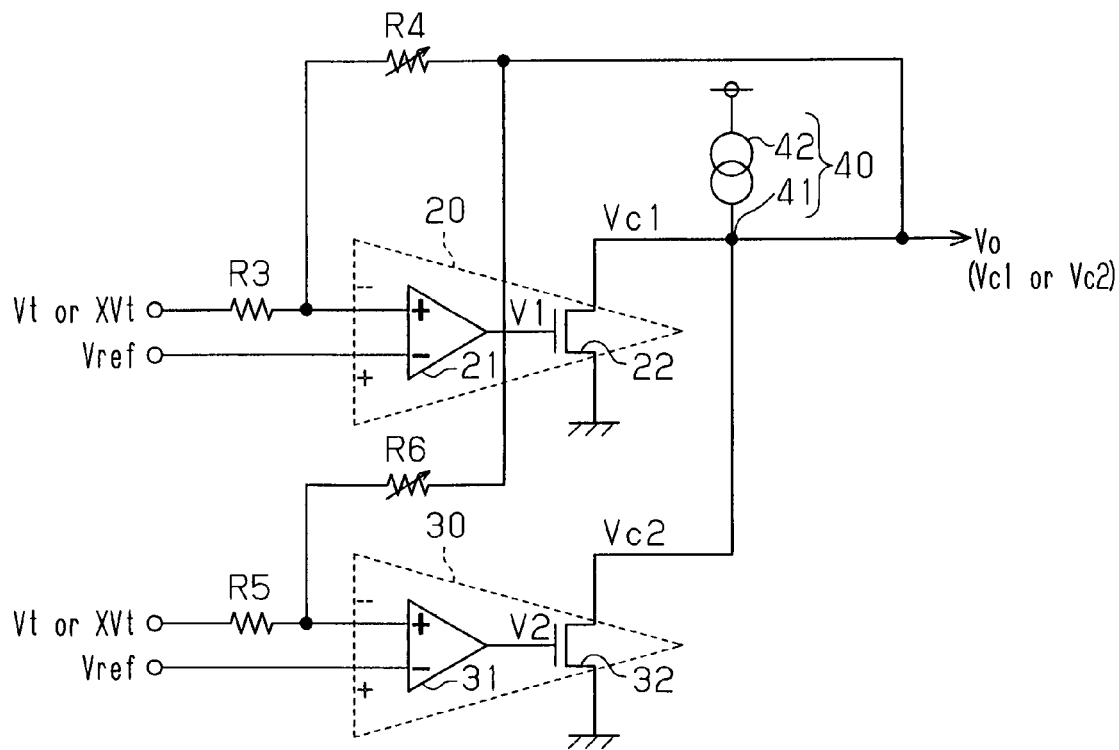
FIG. 7 is a schematic circuit diagram of an OR circuit and a correction amplifier shown in FIG. 4.

The OR circuit 40 shown in FIG. 4 selects the one of the first correction signal Vc1 and the second correction signal Vc2 having the smaller voltage value. Then, the OR circuit 40 outputs the selected correction signal as the output signal Vo. FIG. 7 shows an example of the OR circuit 40 and the correction amplifiers 20 and 30.

As shown in FIG. 7, the correction amplifier 20 includes a differential amplifier 21 and an N-channel metal oxide semiconductor (MOS) transistor 22. The gate of the N-channel MOS transistor 22 is coupled to an output terminal of the differential amplifier 21. In detail, the differential amplifier 21 has a non-inversion input terminal provided with the temperature dependent signal Vt or the inverted signal XVt and an inversion input terminal provided with the reference signal Vref. The differential amplifier 21 generates a first signal V1 from the two signals provided to the two input terminals and provides the first signal V1 to the gate of the N-channel MOS transistor 22. The first signal V1 is dependent on a voltage value obtained by multiplying the difference between the temperature dependent signal Vt or the inverted signal XVt and the reference signal Vref (Vt−Vref or XVt−Vref) by the gain of 1, which is determined by the resistors R3 and R4.

The N-channel MOS transistor 22 has a source coupled to GND and a drain coupled to a constant current source 42. More specifically, the constant current source 42 has a first terminal, which is coupled to a power supply, and a second terminal. The transistor 22 has a drain coupled to the second terminal of the constant current source 42. In other words, the transistor 22 has an open drain structure.

The correction amplifier 30 includes a differential amplifier 31 and an N-channel MOS transistor 32. The N-channel MOS transistor 32 has a gate coupled to an output terminal of the differential amplifier 31. In detail, the differential amplifier 31 has a non-inversion input terminal, which is provided with the temperature dependent signal Vt or the inverted signal XVt, and an inversion input terminal, which is provided with the reference signal Vref. The differential amplifier 31 generates a second signal V2 from the two signals provided to the two input terminals. Then, the differential amplifier 31 provides the second signal V2 to the gate of the N-channel MOS transistor 32. The second signal V2 is dependent on a voltage value obtained by multiplying the difference between the temperature dependent signal Vt or the inverted signal XVt and the reference signal Vref by the gain of 2, which is determined by the resistors R5 and R6.

The N-channel MOS transistor 32 has a source coupled to GND and a drain coupled to the constant current source 42. In other words, the transistor 32 has an open drain structure. The drains of transistor 22 and the transistor 32 are coupled to each other. In other words, the transistors 22 and 32 are coupled to each other through a wired-OR coupling. In the one embodiment, the OR circuit 40 is formed by the wired-OR coupling of the transistors 22 and 32 and the current source 42.

The OR circuit 40 selects the one of the first correction signal Vc1 and the second correction signal Vc2 (refer to FIGS. 6A to 6D) that has the lower voltage value based on the voltage values of the first and second signals V1 and V2. Then, the OR circuit 40 outputs, as the output signal Vo, the selected signal (Vc1 or Vc2) from a coupling point 41 between the transistors 22 and 32. More specifically, when the voltage value of the first signal V1 is higher than the voltage value of the second signal V2, the first correction signal Vc1, which is generated by the correction amplifier 20, is output from the coupling point 41 as the output signal Vo. In this case, the voltage value of the first correction signal Vc1 is lower than the voltage value of the second correction signal Vc2. When the voltage value of second signal V2 is higher than the voltage value of the first signal V1, the second correction signal Vc2, which is generated by the correction amplifier 30, is output from the coupling point 41 as the output signal Vo. In this case, the voltage value of the second correction signal Vc2 is lower than the voltage value of the first correction signal Vc1.

As described above, the wired-OR coupling of the transistors 22 and 32 results in the one of the first and second correction signals Vc1 and Vc2 that has the lower voltage value to be constantly output as the output signal Vo (refer to the solid lines in FIGS. 6A to 6D). As described above, the voltage value relationship between the first and second correction signals Vc1 and Vc2 is reversed at the switching temperature Ts. Accordingly, the output signal Vo, which is output from the OR circuit 40, is switched at the switching temperature Ts, which is the boundary between the first and second correction signals Vc1 and Vc2. More specifically, the temperature characteristics (the rate of voltage change relative to the temperature, or the gradient of the output signal Vo) of the output signal Vo is switched at the switching temperature Ts.

As shown in FIG. 4, the OR circuit 40 is coupled to a first terminal a3 of a switch SW3 and coupled via a resistor R7 to an inversion input terminal of an amplifier 50. A non-inversion input terminal of the amplifier 50 is provided with the reference signal Vref. The amplifier 50 inverts the output signal Vo based on the reference signal Vref and the gain (e.g., 1) that is determined by the resistor R7 and a feedback resistor R8 to generate an inverted output signal XVo (refer to double-dashed lines in FIGS. 6A to 6D). The inverted output signal XVo is provided to a second terminal b3 of the switch SW3. The amplifier 50, the resistor R7, and the feedback resistor R8 form an inversion amplification circuit. The feedback resistor R8 is formed by a variable resistor. The resistance of the feedback resistor R8 is adjusted by a control signal CS6, which is provided from the controller (not shown) based on the temperature characteristics of the sensor output signal Vs. The resistance of the feedback resistor R8 is adjusted to adjust the gain of the inversion amplification circuit (amplifier 50). In the one embodiment, the resistance of the feedback resistor R8 is set to adjust the gain of the inversion amplification circuit (amplifier 50) to, for example, 1.

The switch SW3 has the first and second terminals a3 and b4 and a common terminal c3. The first terminal a3 is coupled to the OR circuit 40. The second terminal b3 is coupled to an output terminal of the amplifier 50. The common terminal c3 is coupled to an input terminal of the sensor amplification circuit 90 shown in FIG. 1A. Thus, when the first terminal a3 and the common terminal c3 are coupled to each other (refer to the solid line in the switch SW3 in FIG. 4), the output signal Vo is output from the temperature characteristic correction circuit 1 as the adjustment signal Va. When the second terminal b3 and the common terminal c3 are coupled to each other (refer to the broken line in the switch SW3 in FIG. 4), the inverted output signal XVo is output from the temperature characteristic correction circuit 1 as the adjustment signal Va. The switch SW3 is switched based on a control signal CS7, which is provided from the controller (not shown) based on the temperature characteristics of the sensor output signal Vs.

The adjustment signal Va output from the temperature characteristic correction circuit 1 of the sensor amplification circuit 90 is used to correct the temperature characteristics of the sensor output signal Vs. Further, the sensor amplification circuit 90 amplifies the corrected signal with a predetermined gain.

The operation of the temperature characteristic correction circuit 1 will now be described.

A case in which the first terminals a1 to a3 and the common terminals c1 to c3 of the switches SW1 to SW3 are coupled to one another based on the control signals CS2, CS4, and CS7 (refer to FIG. 6A) will first be discussed.

When the first terminal a1 and the common terminal c1 of the switch SW1 are coupled to each other, the non-inversion input terminal of the differential amplifier 21 of the correction amplifier 20 is provided with the temperature dependent signal Vt (refer to FIG. 5). The inversion input terminal of the differential amplifier 21 is provided with the reference signal Vref. When the first terminal a2 and the common terminal c2 of the switch SW2 are coupled to each other, the non-inversion input terminal of the differential amplifier 31 of the correction amplifier 30 is provided with the temperature dependent signal Vt. The inversion input terminal of the differential amplifier 31 is provided with the reference signal Vref.

The differential amplifier 21 multiplies a voltage difference (Vt−Vref) between the temperature dependent signal Vt and the reference signal Vref by the gain of 1 of the correction amplifier 20 to generate the first signal V1 of which the voltage value is dependent on the value $\{1*(Vt-Vref)\}$. The differential amplifier 31 further multiplies a voltage difference (Vt−Vref) between the temperature dependent signal Vt and the reference signal Vref by the gain of 2 of the correction amplifier 20 to generate the second signal V2 of which the voltage value is dependent on the value $\{2*(Vt-Vref)\}$.

As shown in FIG. 5, the voltage value of the temperature dependent signal Vt is higher than the voltage value of the reference signal Vref in a region in which the temperature is lower than the switching temperature Ts (hereafter referred to as a "low temperature region"). The voltage value of the temperature dependent signal Vt is lower than the voltage value of the reference signal Vref in a region in which the temperature is higher than the switching temperature Ts (hereafter referred to as a "high temperature region"). The voltage value of the temperature dependent signal Vt is substantially equal to the voltage value of the reference signal Vref at the switching temperature Ts. Thus, the difference (Vt−Vref) between the temperature dependent signal Vt and the reference signal Vref has a positive value in the low temperature region, a negative value in the high temperature region, and a value of zero at the switching temperature Ts.

In the low temperature region, the condition of Vt−Vref>0 results in the voltage value relationship between the first signal V1 (1*(Vt−Vref)) and the second signal V2 (2*(Vt−vref)) being expressed as shown below.

$$1*(Vt-Vref)<2*(Vt-Vref)$$

More specifically, the voltage value relationship between the first and second signals V1 and V2 is represented as shown below.

$$V1<V2$$

Thus, the OR circuit 40 outputs the second correction signal Vc2, which is generated by the correction amplifier 30, as the output signal Vo shown in FIG. 6A. In this case, the voltage value of the second correction signal Vc2 corresponds to a value obtained by inverting a value obtained by multiplying the voltage difference (Vt−Vref) between the temperature dependent signal Vt and the reference signal Vref by 2. Further, the voltage value of the second correction signal Vc2 is lower than the voltage value of the first correction signal Vc1.

At the switch temperature, the condition of Vt−Vref=0 results in the voltage value relationship between the first signal and second signals V1 and V2 being expressed as shown below.

$$V1=V2$$

Thus, the OR circuit 40 outputs the first and second correction signals Vc1 and Vc2, which are generated by the correction amplifiers 20 and 30, as the output signal Vo. In this case, the voltage values of the first and second correction signals Vc1 and Vc2 are equal to the voltage value of the reference signal Vref.

In the high temperature region, the condition of Vt−Vref<0 results in the voltage value relationship between the first and second signals V1 and V2 expressed as shown below.

$$1*(Vt-Vref)>2*(Vt-Vref)$$

More specifically, the voltage value relationship between the first and second signals V1 and V2 is expressed as shown below.

$$V1>V2$$

Thus, the OR circuit 40 outputs the first correction signal Vc1, which is generated by the correction amplifier 20, as the output signal Vo shown in FIG. 6A. In this case, the voltage value of the first correction signal Vc1 corresponds to the value obtained by inverting a value obtained by multiplying the voltage difference (Vref−Vt) between the reference signal Vref and the temperature dependent signal Vt by 1. Further, the voltage value of the first correction signal Vc1 is lower than the voltage value of the second correction signal Vc2.

The OR circuit 40 generates the output signal Vo shown in FIG. 6A. More specifically, the OR circuit 40 constantly outputs the one of the first and second correction signals Vc1 and Vc2 that has the lower voltage value and switches the temperature characteristics (the gradient of the graph) of the output signal Vo at the switching temperature Ts.

The coupling of the first terminal a3 and the common terminal c3 of the switch SW3 provides the output signal Vo to the sensor amplification circuit 90 as the adjustment signal Va (refer to FIG. 1A). Thus, the gradient of the temperature characteristics of the adjustment signal Va is switched at the switching temperature Ts.

When the second terminal b3 and the common terminal c3 of the switch SW3 are coupled to each other, the output signal Vo is inverted by the amplifier 50 based on the reference signal Vref. Thus, the inverted output signal XVo shown in FIG. 6A is provided to the sensor amplification circuit 90 as the adjustment signal Va. In this case, the gradient of the temperature characteristics of the adjustment signal Va is switched at the switching temperature Ts.

The sensor amplification circuit 90 then corrects the temperature characteristics of the sensor output signal Vs using the adjustment signal Va.

Figure 1B:
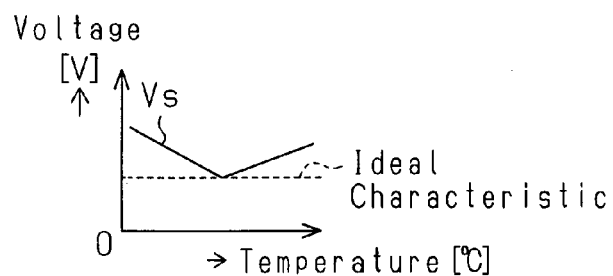
FIG. 1B is a graph schematically showing the temperature to voltage characteristics of a sensor output signal shown in FIG. 1A.
Figure 1C:
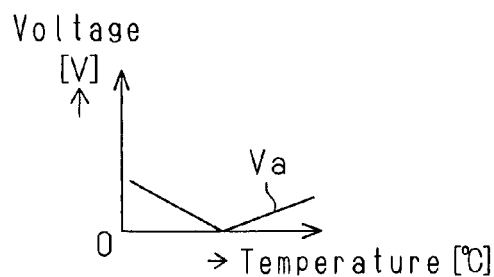
FIG. 1C is a graph schematically showing the temperature to voltage characteristics of the adjustment signal shown in FIG. 1A.
Figure 1D:
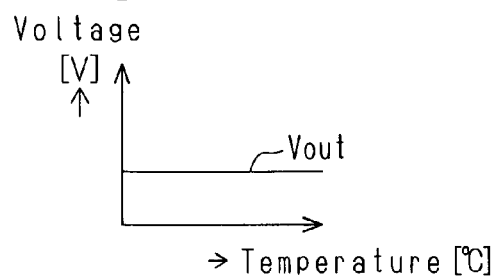
FIG. 1D is a graph schematically showing the temperature to voltage characteristics of the amplified signal shown in FIG. 1A.
Figure 2:
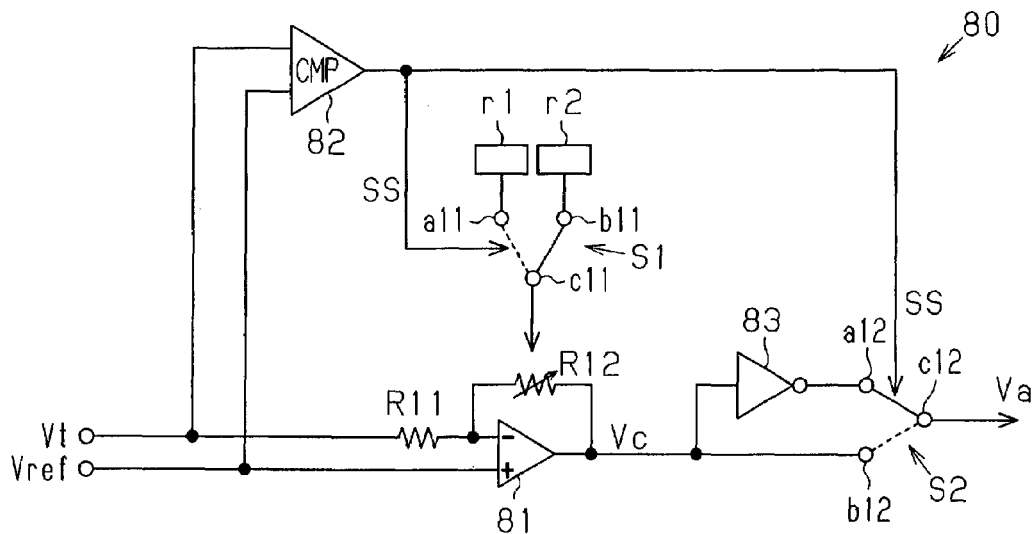
FIG. 2 is a schematic circuit diagram of the temperature characteristic correction circuit shown in FIG. 1A.

Next, the generation of an adjustment signal Va that corrects the V-shaped temperature characteristics of the output signal Vs shown in FIG. 1B will be discussed. The output signal Vs (temperature characteristics) shown in the graph of FIG. 1B has a gradient that is two times greater than the gradient of the straight line representing the temperature dependent signal Vt (FIG. 5), which is provided to the input terminal T1 of the temperature characteristic correction circuit 1, in the low temperature region. Further, the output signal Vs shown in FIG. 1B has a gradient that is minus one times greater than the gradient of the straight line representing the temperature dependent signal Vt in the high temperature region.

To obtain the adjustment signal Va that has the same temperature characteristics as the output signal Vs, the switch SW3 is first switched based on the control signal CS7. More specifically, to obtain the adjustment signal Va that has the V-shaped gradient shown in FIG. 1B, the inverted output signal XVo shown in FIG. 6D must be output as the adjustment signal Va. The controller (not shown) provides the switch SW3 with the control signal CS7 for coupling the second terminal b3 and the common terminal c3.

Next, the switches SW1 and SW2 are switched and the gains of the amplifiers 10, 20, 30, and 50 are set based on the temperature characteristics of the output signal Vs. As described above, the output signal Vs has a gradient represented by Vt*2 in the low temperature region and a gradient represented by Vt*(−1) in the high temperature region. Thus, one of the first correction signal Vc1 and the second correction signal Vc2 is set to have the temperature characteristics of gradient Vt*2 and the other one is set to have the temperature characteristics of gradient Vt*(−1). More specifically, the controller provides the control signal CS2 for coupling the second terminal b1 and the common terminal c1 of the switch SW1 and the control signal CS4 for coupling the first terminal a2 and the common terminal c2 of the switch SW2 to the correction circuit 1 to generate the inverted output signal XVo shown in FIG. 6D. The resistance of the feedback resistor R4 is set based on the control signal CS3 to adjust the gain of the correction amplifier 20 to 1. The resistances of the feedback resistors R2 and R8 are set based on the control signals CS1 and CS6 to adjust the gains of the inversion amplification circuits (amplifiers 10 and 50) to 1.

When the second terminal b1 and the common terminal c1 of the switch SW1 are coupled to each other, the non-inversion input terminal of the differential amplifier 21 in the correction amplifier 20 is provided with the inverted signal XVt of the temperature dependent signal Vt (refer to the dashed line in FIG. 5). Further, the inversion input terminal of the differential amplifier 21 is provided with the reference signal Vref. When the first terminal a2 and the common terminal c2 of the switch SW2 are coupled to each other, the non-inversion input terminal of the differential amplifier 31 in the correction amplifier 30 is provided with the temperature dependent signal Vt (refer to FIG. 5). Further, the inversion input terminal of the differential amplifier 31 is provided with the reference signal Vref.

The differential amplifier 21 multiplies the voltage difference (XVt−Vref) between the inverted signal XVt and the reference signal Vref by the gain of 1 of the correction amplifier 20 to generate the first signal V1 of which the voltage value is dependent on the value $\{1*(XVt-Vref)\}$. The differential amplifier 31 further multiplies the voltage difference (Vt−Vref) between the temperature dependent signal Vt and the reference signal Vref by the gain of 2 of the correction amplifier 30 to generate the second signal V2 of which the voltage value is dependent on the value $\{2*(Vt-Vref)\}$.

As shown in FIG. 5, the voltage value of the temperature dependent signal Vt is higher than the voltage value of the reference signal Vref in the low temperature region. The voltage value of the temperature dependent signal Vt is lower than the voltage value of the reference signal Vref in the high temperature region. Contrary to the temperature dependent signal Vt, the voltage value of the inverted signal XVt is lower than the voltage value of the reference signal Vref in the low temperature region and higher than the voltage value of the reference signal Vref in the high temperature region. The voltage values of the temperature dependent signal Vt and the inverted signal XVt are both substantially equal to the voltage value of the reference signal Vref at the switching temperature Ts. Thus, the difference (Vt−Vref) between the temperature dependent signal Vt and the reference signal Vref has a positive value in the low temperature region, a negative value in the high temperature region, and a value of zero at the switching temperature Ts. Further, the difference (XVt−Vref) between the inverted signal XVt and the reference signal Vref has a negative value in the low temperature region, a positive value in the high temperature region, and a value of zero at the switching temperature Ts.

In the low temperature region, due to the conditions of Vt−Vref>0 and XVt−Vref<0, the voltage value relationship between the first signal V1 (i.e., 1*(XVt−Vref)) and the second signal V2 (i.e., 2*(Vt−vref)) is expressed as described below.

$$1*(XVt-Vref) < 2*(Vt-Vref)$$

More specifically, the voltage value relationship between the first and second signals V1 and V2 is as shown below.

$$V1 < V2$$

Thus, the OR circuit 40 outputs the second correction signal Vc2, which is generated by the correction amplifier 30, as the output signal Vo shown in FIG. 6D. The voltage value of the second correction signal Vc2 corresponds to the value obtained by inverting a value obtained by multiplying the voltage difference (Vt−Vref) between the temperature dependent signal Vt and the reference signal Vref by 2. Further, The voltage value of the second correction signal Vc2 is smaller than the voltage value of the first correction signal Vc1.

At the switching temperature Ts, due to the conditions of Vt−Vref=0 and XVt−Vref=0, the voltage value relationship between the first and second signals V1 and V2 is expressed as described below.

$$V1=V2$$

Thus, the OR circuit 40 outputs the first and second correction signals Vc1 and Vc2, which are generated by the correction amplifiers 20 and 30, as the output signal Vo. The voltage values of the first and second correction signals Vc1 and Vc2 are equal to the voltage value of the reference signal Vref.

In the high temperature region, due to the conditions of Vt−Vref<0 and XVt−Vref>0, the voltage value relationship between the first and second signals V1 and V2 is expressed as described below.

$$1*(XVt-Vref)>2*(Vt-Vref)$$

More specifically, the voltage value relationship between the first and second signals V1 and V2 is expressed as described below.

$$V1>V2$$

Thus, the OR circuit 40 outputs the first correction signal Vc1, which is generated by the correction amplifier 20, as the output signal Vo as shown in FIG. 6D. The voltage value of the first correction signal Vc1 corresponds to the value obtained by inverting the value obtained by multiplying the voltage difference (XVt−Vref) between the inverted signal XVt and the reference signal Vref by 1. Further, the voltage value of the first correction signal Vc1 is smaller than the voltage value of the second correction signal Vc2.

In this manner, the OR circuit 40 generates the output signal Vo shown in FIG. 6D. More specifically, the OR circuit 40 constantly outputs the one of the first and second correction signals Vc1 and Vc2 that has the lower voltage value and switches the gradient of the temperature characteristics of the output signal Vo at the switching temperature Ts.

The second terminal b3 and the common terminal c3 of the switch SW3 are coupled to each other so that the amplifier 50 inverts the output signal Vo based on the reference signal Vref. As a result, the inverted output signal XVo having the V-shaped gradient shown in FIG. 6D is generated as the adjustment voltage Va. More specifically, the temperature characteristic correction circuit 1 generates the adjustment signal Va having the same temperature characteristics as the output signal Vs having the V-shaped temperature characteristics shown in FIG. 1B. As a result, the sensor amplification circuit 90 (refer to FIG. 1A) corrects the temperature characteristics of the output signal Vs using the adjustment signal Va.

Figure 8:
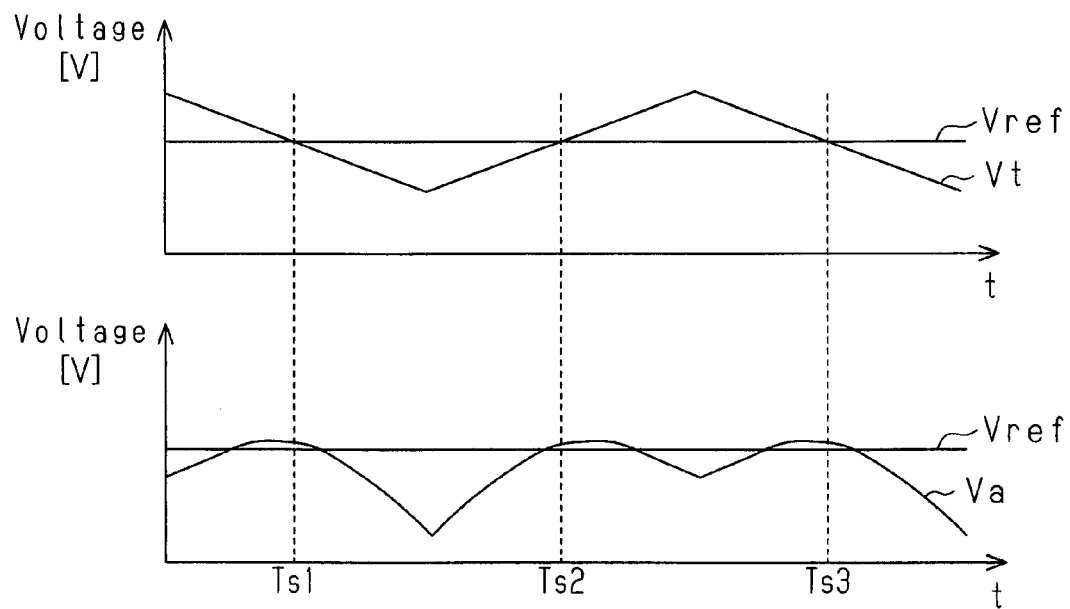
FIG. 8 is a graph showing simulation results of the adjustment signal shown in FIG. 4.

FIG. 8 is a waveform chart showing simulation results of the adjustment signal Va, which is generated by the temperature characteristic correction circuit 1 of FIG. 4 based on the reference signal Vref and the temperature dependent signal Vt, which has a triangular waveform and includes temperature characteristics. In this simulation, the first terminal a1 and the common terminal c1 of the switch SW1 are coupled to each other, the first terminal a3 and the common terminal c3 of the switch SW3 are coupled to each other, and the second terminal b2 and the common terminal c2 of the switch SW2 are coupled to each other.

Figure 3A:
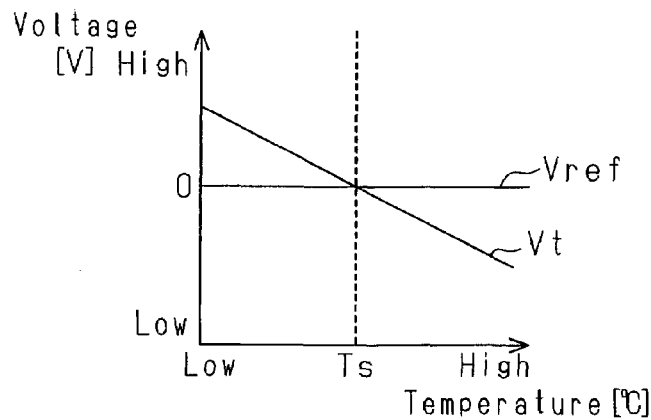
FIG. 3A is a graph schematically showing the temperature to voltage characteristics of a temperature dependent signal and a reference signal shown in FIG. 2.
Figure 3B:
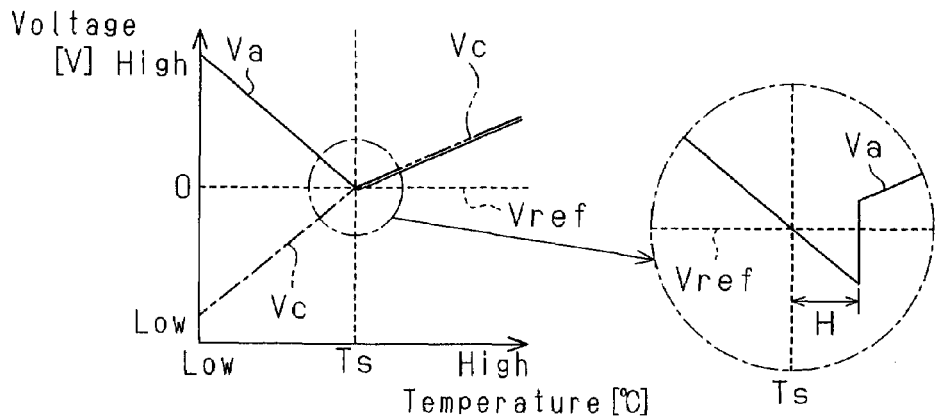
FIG. 3B is a graph schematically showing the temperature to voltage characteristics of a correction signal (adjustment signal) shown in FIG. 2.

As apparent from FIG. 8, the adjustment signal Va, which is generated by the temperature characteristic correction circuit 1 of the one embodiment, switches smoothly from the first correction signal Vc1 to the second correction signal Vc2 at the switching temperature Ts1. Further, the adjustment signal Va also smoothly switches from the second correction signal Vc2 to the first correction signal Vc1 at the switching temperature Ts2. In the same manner, the adjustment signal Va switches smoothly from the first correction signal Vc1 to the second correction signal Vc2 at the switching temperature Ts3. The temperature characteristic correction circuit 1 of the one embodiment does not perform logical switching with the comparator 82 like in the prior art. As a result, a step that interrupts the continuity of the adjustment signal Va as shown in FIG. 3B is not produced near the switch temperatures Ts1, Ts2, and Ts3. This improves the temperature characteristics correction accuracy of the adjustment signal Va.

The temperature characteristic correction circuit 1 of the one embodiment has the advantages described below.

(1) The OR circuit 40, which is formed by a wired-OR coupling, outputs the one of the first and second correction signals Vc1 and Vc2 that has the lower voltage value as the output signal Vo. The voltage value relationship between the first and second correction signals Vc1 and Vc2 is reversed at the switching temperature Ts. As a result, the output signal Vo is switched between the first correction signal Vc1 and the second correction signal Vc2 at the switching temperature Ts. Accordingly, the adjustment signal Va switches its temperature characteristics, that is, the rate of voltage change relative to the temperature, at the switching temperature Ts without using a comparator. As a result, a phenomenon similar to oscillation in a comparator does not occur and generation of the hysteresis width H (FIG. 3B) is avoided. Thus, the temperature characteristic correction circuit 1 smoothly switches the temperature characteristics (gradient) of the adjustment signal Va. This improves the correction accuracy of the temperature characteristics. Further, since there is no need to add a hysteresis, the gradient of the temperature dependent signal Vt may be small. This improves the degree of freedom for the gradient of the temperature dependent signal Vt.

(2) The feedback resistors R4 and R6 of the correction amplifiers 20 and 30 are formed by variable resistors. The resistances of the feedback resistors R4 and R6 are adjusted by the control signals CS3 and CS5 based on the temperature characteristics of the sensor output signal Vs. The resistances of the feedback resistors R4 and R6 are adjusted to adjust the gains of the correction amplifiers 20 and 30. This improves the degree of freedom of the temperature characteristics of the correction signals Vc1 and Vc2, which are generated by the correction amplifiers 20 and 30. This consequently improves the degree of freedom of the temperature characteristics of the adjustment signal Va. Further, the gains of the correction amplifiers 20 and 30 are set based on the temperature characteristics of the output signal Vs, which is the correction subject. This generates the correction signals Vc1 and Vc2 (adjustment signal Va) in accordance with the temperature characteristics of the output signal Vs. Accordingly, the correction accuracy of the temperature characteristics is improved.

(3) The feedback resistors R2 and R8 of the amplifiers 10 and 50 are formed by variable resistors. The resistances of the feedback resistors R2 and R8 are adjusted by the control signals CS1 and CS6 based on the temperature characteristics of the sensor output signal Vs. Thus, the gains of the inversion amplification circuits (amplifiers 10 and 50) are changed based on the output signal Vs. This improves the degree of freedom of the temperature characteristics of the adjustment signal Va, and generates the adjustment signal Va in accordance with the temperature characteristics of the output signal Vs. This improves the correction accuracy of the temperature characteristics.

(4) The switches SW1 to SW3 are switched based on the temperature characteristics of the sensor output signal Vs. This generates the adjustment signal Va in accordance with the temperature characteristics of the output signal Va. Thus, the adjustment signal Va is generated in accordance with the temperature characteristics of the output signal Vs.

A temperature characteristic control circuit 100 according to another embodiment will now be described with reference to FIGS. 9 to 12.

Figure 9:
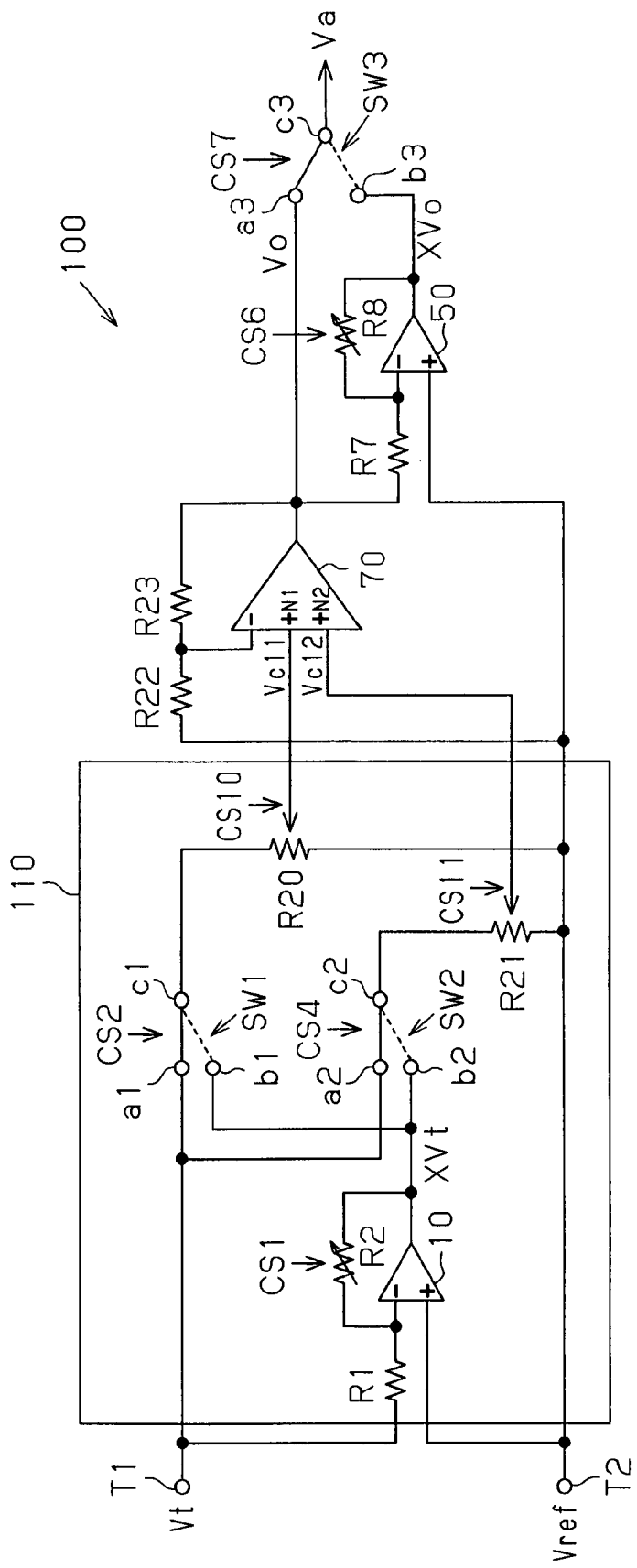
FIG. 9 is a schematic circuit diagram of a temperature characteristic correction circuit according to another embodiment.

As shown in FIG. 9, a variable resistor R20 is arranged between a common terminal c1 of a switch SW1 and an input terminal T2. A voltage dividing point (resistance) of the variable resistor R20 is adjusted by a control signal CS10, which is output from a controller (not shown) based on the temperature characteristics of a sensor output signal Vs (refer to FIG. 1B). A first correction signal Vc11 (refer to the dashed line in FIG. 11) having a voltage value determined by the resistance of the variable resistor R20 is provided to a first non-inversion input terminal N1 of a gradient synthesizing amplifier 70. The resistance of the variable resistor R20 is adjusted to change the gradient of the temperature characteristics of the first correction signal Vc11 shown in FIG. 11.

A variable resistor R21 is arranged between a common terminal c2 of a switch SW2 and the input terminal T2. The resistance of the variable resistor R21 is adjusted by a control signal CS11, which is output from the controller based on the temperature characteristics of the sensor output signal Vs. A second correction signal Vc12 (refer to the broken line in FIG. 11) having a voltage value determined by the resistance of the variable resistor R21 is provided to a non-inversion input terminal N2 of the gradient synthesizing amplifier 70. The resistance of the variable resistor R21 is adjusted to change the gradient of the temperature characteristics of the second correction signal Vc12 shown in FIG. 11. In another embodiment, a voltage generation unit 110 includes an inversion amplification circuit, which is formed by an amplifier 10, the switches SW1 and SW2, and the variable resistor R20 and R21.

Figure 11:
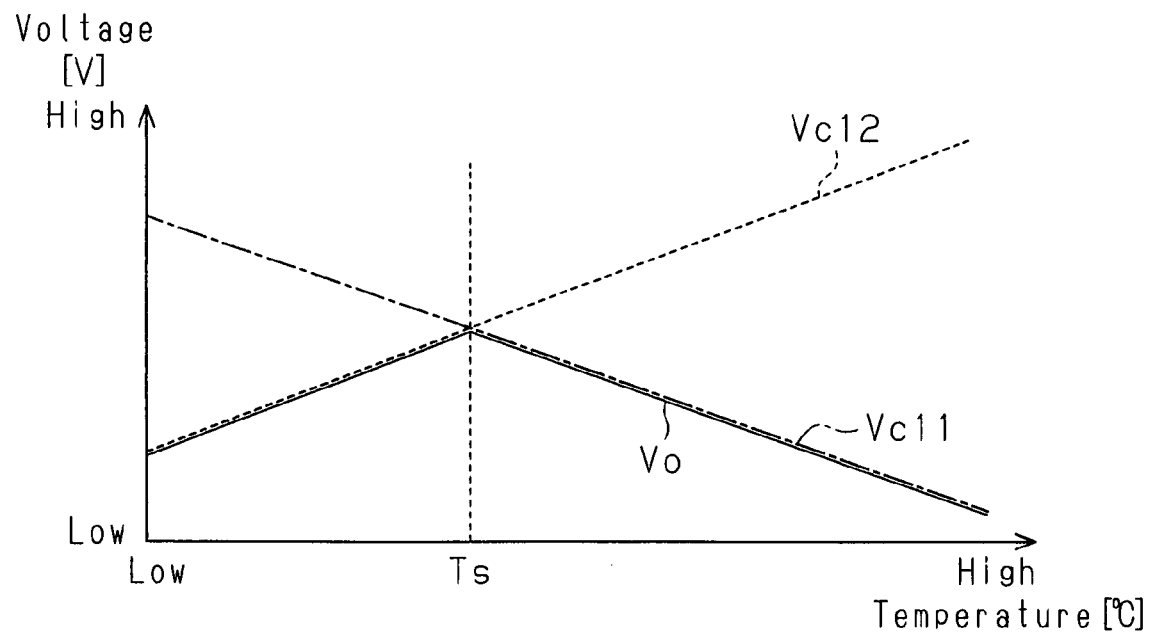
FIG. 11 is a graph schematically showing the temperature to voltage characteristics of an output signal shown in FIG. 10.

FIG. 11 shows the first and second correction signals Vc11 and Vc12, which are generated by the voltage generation unit when the first terminal 1a and the common terminal c1 of the switch SW1 are coupled to each other and the second terminal b2 and the common terminal c2 of the switch SW2 are coupled to each other. The voltages of the first and second correction signals Vc11 and Vc12 change at different gradients (rates) relative to the temperature. Thus, the voltage value relationship between the first and second correction signals Vc11 and Vc12 is reversed at a switching temperature Ts, at which the voltage values of the correction signals Vc11 and Vc12 are the same. More specifically, as shown in FIG. 11, the voltage value of the second correction signal Vc12 is lower than the voltage value of the first correction signal Vc11 in a region in which the temperature is lower than the switching temperature Ts (low temperature region), and the voltage value of the first correction signal Vc11 is lower than the voltage value of the second correction signal Vc12 in a region in which the temperature is higher than the switching temperature Ts (high temperature region).

An inversion input terminal of the gradient synthesizing amplifier 70 is coupled to the input terminal T2 via a resistor R22 and to an output terminal of the gradient synthesizing amplifier 70 via a feedback resistor R23. The gradient synthesizing amplifier 70, the resistor R22, and the feedback resistor R23 form a non-inversion amplification circuit. In another embodiment, the resistances of the resistor R22 and the feedback resistor R23 are set to adjust the gain of the non-inversion amplification circuit, which is formed by the gradient synthesizing amplifier 70, to 1.

Figure 10:
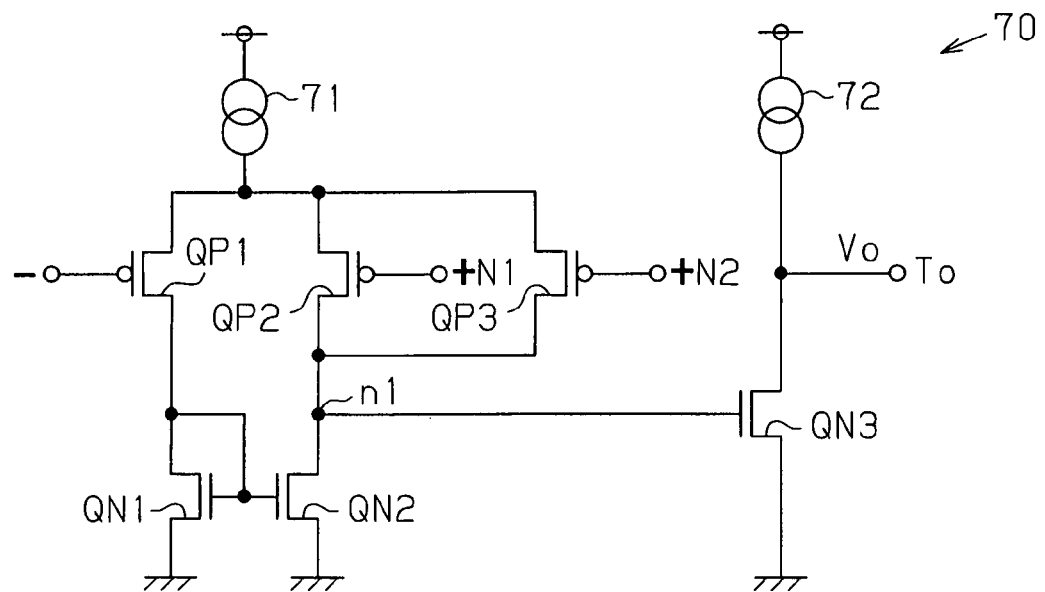
FIG. 10 is a schematic circuit diagram of a gradient synthesizing amplifier shown in FIG. 9.

The gradient synthesizing amplifier 70 (non-inversion amplification circuit) includes first and second non-inversion input terminals N1 and N2 for respectively receiving the first and second correction signals Vc11 and Vc12. Further, the gradient synthesizing amplifier 70 outputs the one of the first and second correction signals Vc11 and Vc12 that has a lower voltage as an output signal Vo (refer to the solid line in FIG. 11). The output signal Vo is switched to the first correction signal Vc11 or the second correction signal Vc12 at the switching temperature Ts. More specifically, the gradient synthesizing amplifier 70 (non-inversion amplification circuit) synthesizes the gradients of the temperature characteristics of the first and second correction signals Vc11 and Vc12 to generate the output signal Vo. The output signal Vo is then provided to a sensor amplification circuit 90 (refer to FIG. 1A) as an adjustment signal Va via a switch SW3 or via an amplifier 50 (inversion amplification circuit) and the switch SW3. FIG. 10 shows an example of the gradient synthesizing amplifier 70.

As shown in FIG. 10, the gradient synthesizing amplifier 70 includes P-channel MOS transistors QP1, QP2, and QP3, of which sources are coupled to a current source 71. The gate (control terminal) of the MOS transistor QP1 is coupled to the inversion input terminal of the gradient synthesizing amplifier 70. The drain of the MOS transistor QP1 is coupled to the drain of an N-channel MOS transistor QN1 and the gates of N-channel MOS transistors QN1 and QN2. The sources of the MOS transistors QN1 and QN2 are coupled to ground. The N-channel MOS transistors QN1 and QN2 form a current mirror circuit.

The gate (control terminal) of the MOS transistor QP2 is coupled to the first non-inversion input terminal N1 of the gradient synthesizing amplifier 70. More specifically, the MOS transistor QP2 operates in response to the first correction signal Vc11. The gate (control terminal) of the MOS transistor QP3 is coupled to the second non-inversion input terminal N2 of the gradient synthesizing amplifier 70. More specifically, the MOS transistor QP3 operates in response to the second correction signal Vc12. The MOS transistors QP2 and QP3 are coupled in parallel. Thus, the drains of the MOS transistors QP2 and QP3 are coupled commonly to the drain of the MOS transistor QN2. The P-channel MOS transistors QP1 to QP3 form a differential pair. The current mirror circuit (QN1 and QN2) and the differential pair (QP1 to QP3) form a differential input circuit.

A node n1 between the MOS transistors QP2 and QP3 and the MOS transistor QN2 is coupled to the gate of an N-channel MOS transistor QN3, which is an output-stage transistor. The drain of the MOS transistor QN3 is coupled to a current source 72 and to an output terminal To, from which the output signal Vo is output. The source of the MOS transistor QN3 is coupled to ground.

The operation of the temperature characteristic correction circuit 100 that includes the gradient synthesizing amplifier 70 will now be discussed.

Based on the temperature characteristics of the sensor output signal Vs, the controller (not shown) first provides the correction circuit 100 with the control signal CS2 for coupling the first terminal a1 and the common terminal c1 of the switch SW1, the control signal CS7 for coupling the first terminal a3 and the common terminal c3 of the switch SW3, and the control signal CS4 for coupling the second terminal b2 and the common terminal c2 of the switch SW2. The controller further provides the control signals CS10 and CS11. The control signals SC10 and CS11 set the resistances of the variable resistors R20 and R21. As a result, the first and second non-inversion input terminals N1 and N2 of the gradient synthesizing amplifier 70 are respectively provided with the first and second correction signals Vc11 and Vc12 shown in FIG. 11.

In the region in which the temperature is lower than the switching temperature Ts, the voltage value relationship between the first and second correction signals Vc11 and Vc12 is as described below (refer to FIG. 11).

$$Vc11 > Vc12$$

Thus, the gradient synthesizing amplifier 70 outputs the second correction signal Vc12 as the output signal Vo.

At the switching temperature Ts, the voltage value relationship between the first correction signal Vc11 and the second correction signal Vc12 is as described below (refer to FIG. 11).

$$Vc11 = Vc12$$

Thus, the gradient synthesizing amplifier 70 outputs the first and second correction signals Vc11 and Vc12 as the output signal Vo.

In the region in which the temperature is higher than the switching temperature Ts, the voltage value relationship between the first and second correction signals Vc11 and Vc12 is as described below (refer to FIG. 11).

$$Vc11 < Vc12$$

Thus, the gradient synthesizing amplifier 70 outputs the first correction signal Vc11 as the output signal Vo.

In this manner, the gradient synthesizing amplifier 70 synthesizes the gradients of the temperature characteristics of the first and second correction signals Vc11 and Vc12 to generate the output signal Vo (refer to the solid line in FIG. 11). In detail, the gradient synthesizing amplifier 70 constantly outputs the one of the first and second correction signals Vc11 and Vc12 that has the lower voltage value and switches the gradient of the temperature characteristics of the output signal Vo at the switching temperature Ts.

The first terminal a3 and the common terminal c3 of the switch SW3 are coupled to each other to provide the sensor amplification circuit 90 with the output signal Vo as the adjustment signal Va (refer to FIG. 1A). As a result, the gradient of the temperature characteristics of the adjustment signal Va is switched at the switching temperature Ts.

When the second terminal b3 and the common terminal c3 of the switch SW3 are coupled to each other, the output signal Vo is inverted based on the reference signal Vref. The inverted output signal XVo is provided to the sensor amplification circuit 90 as the adjustment signal Va.

The sensor amplification circuit 90 then corrects the temperature characteristics of the sensor output signal Vs using the adjustment signal Va.

Figure 12:
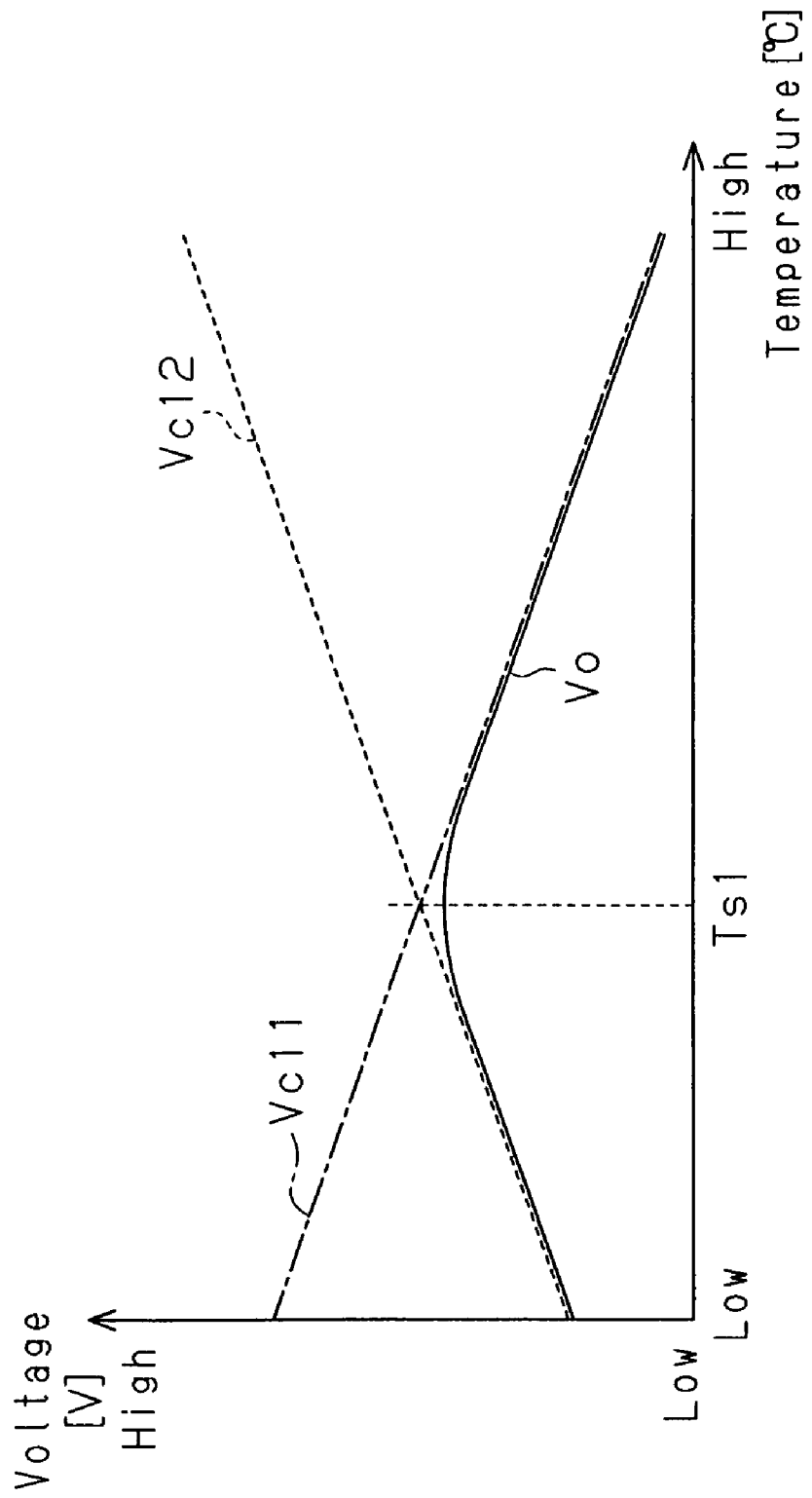
FIG. 12 is a graph schematically showing simulation results of the output signal shown in FIG. 10.

FIG. 12 shows the simulation results of the output signal Vo, which is generated by the gradient synthesizing amplifier 70 using the first and second correction signals Vc11 and Vc12 shown in FIG. 11.

As apparent from FIG. 12, the output signal Vo (refer to the solid line in FIG. 12), which is generated by the gradient synthesizing amplifier 70 of another embodiment, smoothly switches from the second correction signal Vc12 to the first correction signal Vc11 at the switching temperature Ts1. More specifically, the temperature characteristic control circuit 100 of the another embodiment does not perform logical switching with the comparator 82 as in the prior art. As a result, a step that interrupts the continuity of the adjustment signal Va as shown in FIG. 3B is not produced near the switch temperature Ts1. This improves the temperature characteristics correction accuracy of the adjustment signal Va, which is generated based on the output signal Vo.

The temperature characteristic correction circuit 100 of another embodiment has the advantages described below in addition to advantages (3) and (4) of the one embodiment.

(5) The non-inversion amplification circuit that includes the gradient synthesizing amplifier 70 having three input terminals has the gain of 1. The gradient synthesizing amplifier 70 receives the first and second correction signals Vc11 and Vc12, and the non-inversion amplification circuit outputs the one of the first and second correction signals Vc11 and Vc12 that has the lower voltage value as the output signal Vo. The voltage value relationship between the first and second correction signals Vc11 and Vc12 is reversed at the switching temperature Ts, that is, the intersection of the first and second correction signals Vc11 and Vc12. As a result, the output signal Vo is switched to the first correction signal Vc11 or the second correction signal Vc12 at the switching temperature Ts. This switches the gradient of the voltage change of the adjustment signal Va relative to temperature at the switching temperature Ts without using a comparator. As a result, a phenomenon similar to oscillation in a comparator does not occur and generation of the hysteresis width H is avoided. Thus, the gradient of the adjustment signal Va is smoothly changed.

(6) The resistances of the feedback resistors R20 and R21 are adjusted by the control signals CS10 and CS11 that are output based on the temperature characteristics of the sensor output signal Vs. The resistances of the variable resistors R20 and R21 are adjusted to change the gradients of the temperature characteristics of the first and second correction signals Vc11 and Vc12. This improves the degree of freedom of the temperature characteristics of the output signal Vo and improves the degree of freedom of the temperature characteristics of the adjustment signal Va. Further, the resistances of the variable resistors R20 and R21 are set based on the temperature characteristics of the output signal Vs, which is the correction subject. Thus, the output signal Vo (adjustment signal Va) is generated in accordance with the temperature characteristics of the output signal Vs. This improves the correction accuracy of the temperature characteristics.

(7) In the one embodiment, the OR circuit 40 synthesizes the gradients of the temperature characteristics of the first and second correction signals Vc1 and Vc2, which are generated by the correction amplifiers 20 and 30. In other words, the output-stage circuits of the correction amplifiers 20 and 30 synthesize the gradients of the temperature characteristics of the first and second correction signals Vc1 and Vc2. In this case, the number of required correction amplifiers correspond to the number of different correction signals (two in the one embodiment), which are used to generate the output signal Vo. In another embodiment, the input-stage circuit of the gradient synthesizing amplifier 70 synthesizes the gradients of the temperature characteristics of the first and second correction signals Vc11 and Vc12. This enables the single gradient synthesizing amplifier 70 to synthesize the temperature characteristic gradients of the two correction signals Vc11 and Vc12. Even if the number of correction signals that are used to generate the output signal Vo further increases, the single gradient synthesizing amplifier 70 can be used to synthesize the temperature characteristics gradients of the correction signals. Thus, enlargement of the circuit scale can be avoided even when the adjustment signal Va has complicated temperature characteristics. Further, the structure of another embodiment, which uses less amplifiers (correction amplifiers or the like) than the one embodiment, reduces errors that would be generated by offset voltages.

It should be apparent to those skilled in the art that the aforementioned embodiments may be embodied in many other specific forms without departing from the spirit or scope of the embodiments. Particularly, it should be understood that the embodiments may be embodied in the following forms.

In the one embodiment, the current source of the OR circuit 40 is only required to supply current and is thus not limited to the constant current source 42 that supplies a constant current.

Figure 13:
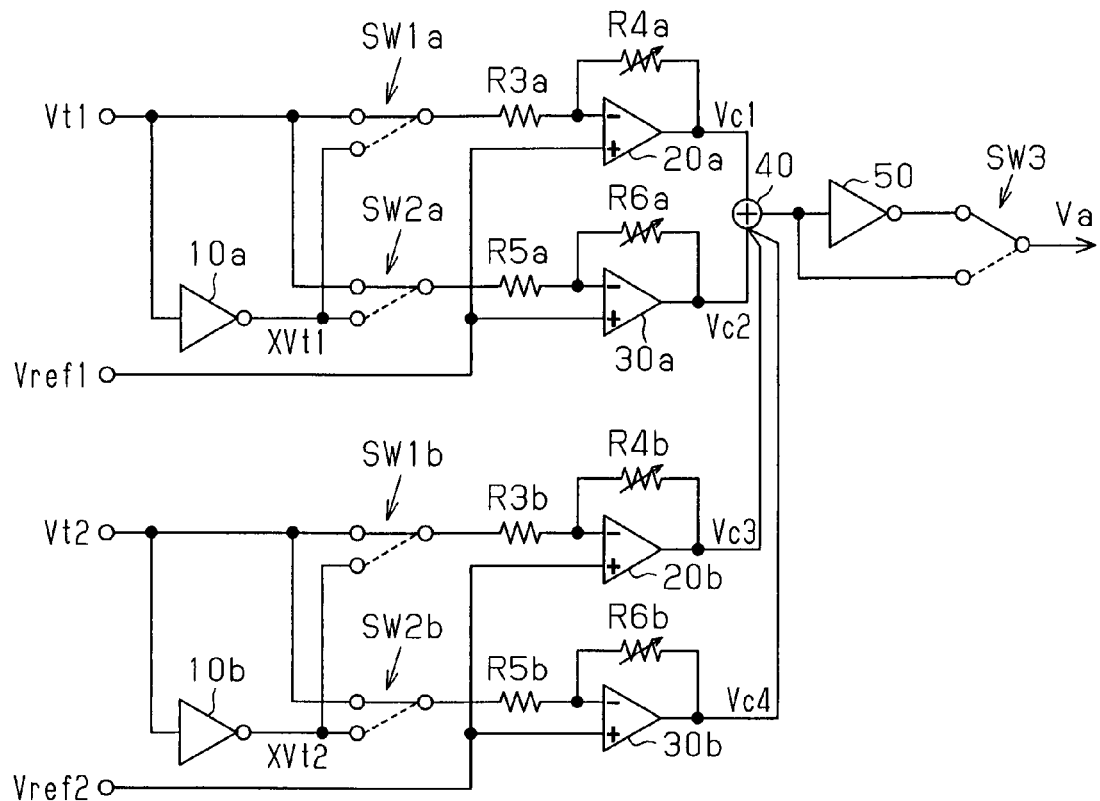
FIG. 13 is a schematic circuit diagram showing a modified structure of the temperature characteristic correction circuit of FIG. 4.

In the one embodiment, the adjustment signal Va may be generated based on two or more sets of temperature dependent signals and reference signals. For example, a temperature characteristic correction circuit shown in FIG. 13 includes correction amplifiers 20a and 30a and correction amplifiers 20b and 30b. The correction amplifiers 20a and 30a generate first and second correction signals Vc1 and Vc2 based on a first temperature dependent signal Vt1 and a first reference signal Vref1. The correction amplifiers 20b and 30b generate third and fourth correction signals Vc3 and Vc4 based on a second temperature dependent signal Vt2 and a second reference signal Vref2. In this case, an OR circuit 40 may be formed by coupling output terminals of the correction amplifiers 20a, 30a, 20b, and 30b through a wired-OR coupling. The OR circuit 40 outputs the one of the first to fourth correction signals Vc1 to Vc4 that has the lowest voltage value as an output signal Vo. When, for example, the OR circuit 40 is provided with correction signals Vc1 to Vc4 shown in FIG. 14, the OR circuit 40 outputs the first correction signal Vc1 as an adjustment signal Va at temperatures lower than a switching temperature Ts11, outputs the third correction signal Vc3 as the adjustment signal Va at temperatures between the switching temperature Ts11 and a switching temperature Ts12, outputs the fourth correction signal Vc4 as the adjustment signal Va at temperatures between the switching temperature Ts12 and a switching temperature Ts13, and outputs the second correction signal Vc2 as the adjustment signal Va at temperatures higher than the switching temperature Ts13.

Figure 14:
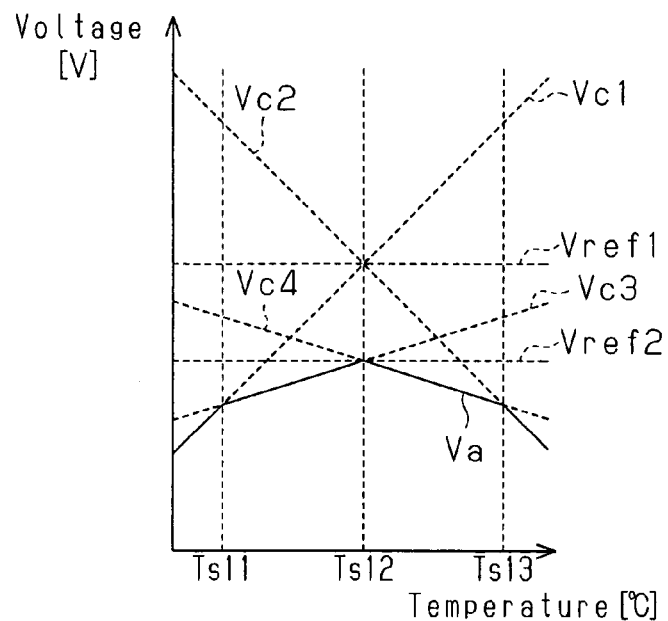
FIG. 14 is a graph showing the temperature to voltage characteristics of an adjustment signal shown in FIG. 13.

As apparent from FIG. 14, this structure increases the degree of freedom of the characteristics of the adjustment signal Va as the number of correction signals provided to the OR circuit 40 increases. The OR circuit 40 may further be provided with a temperature dependent signal Vt having curved temperature characteristics to improve the degree of freedom of the characteristics of the adjustment signal Va.

Figure 15:
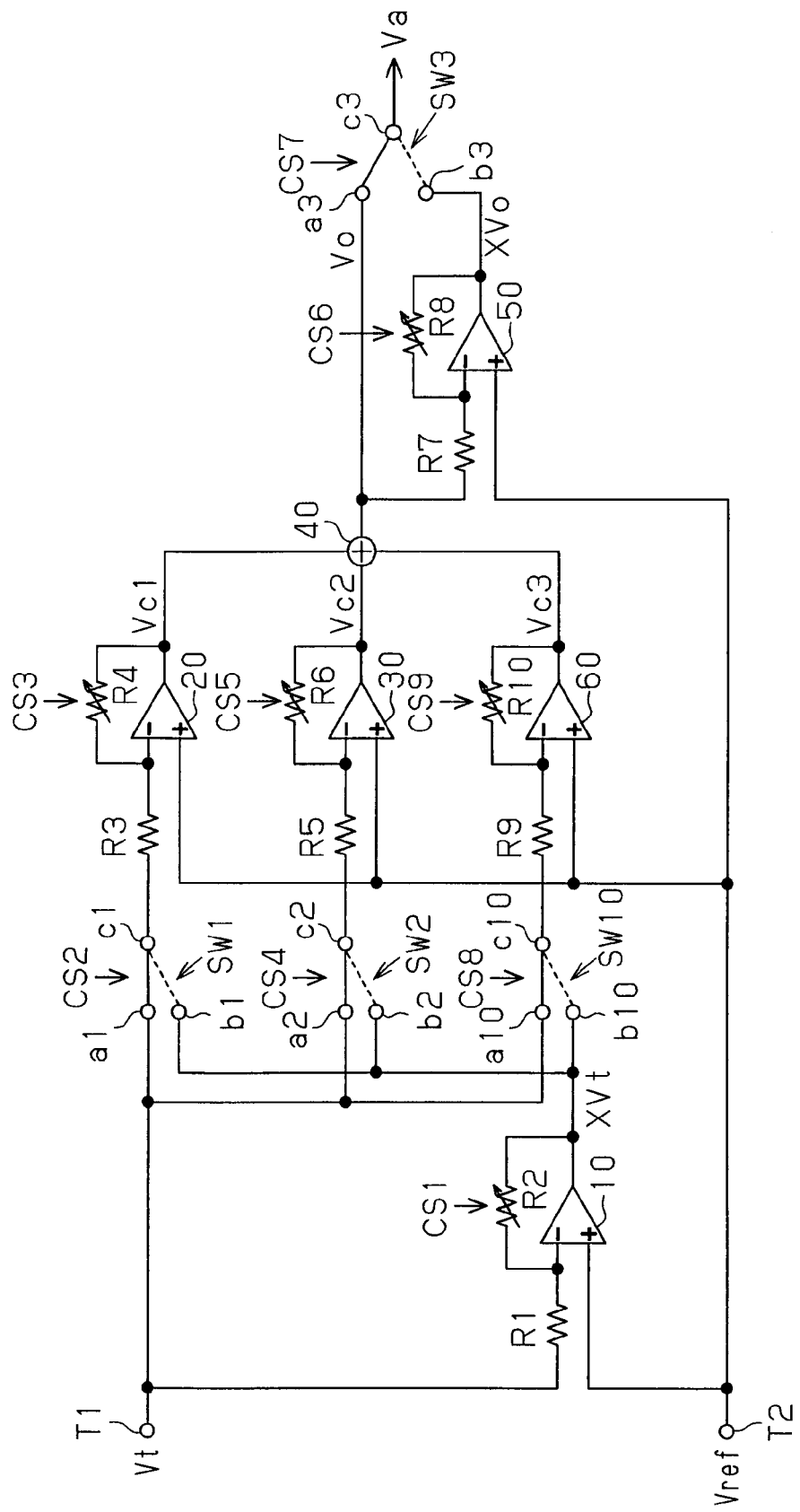
FIG. 15 is a schematic circuit diagram showing a modified structure of the temperature characteristic correction circuit of FIG. 4.

In the one embodiment, as shown in FIG. 15, the temperature characteristic correction circuit may include three or more (three in FIG. 15) correction amplifiers 20, 30, and 60. In this case, each of the amplifiers 20, 30, and 60 receives either a temperature dependent signal Vt or an inverted signal XVt and a reference signal Vref. An OR circuit 40 is formed by coupling output terminals of the amplifiers 20, 30, and 60 through a wired-OR coupling. The OR circuit 40 is provided with correction signals Vc1, Vc2, and Vc3 from the correction amplifiers 20, 30, and 60. Then, the OR circuit 40 and outputs the one of the correction signals Vc1, Vc2, and Vc3 that has the lowest voltage value as an output signal Vo. This structure is particularly advantageous when the temperature dependent signal Vt has curved temperature characteristics. It is preferred that the feedback resistor R10 of the correction amplifier 60 be formed by a variable resistor. In this case, the gain of the feedback resistor R10 is adjustable in the same manner as for the correction amplifiers 20 and 30.

In the one embodiment, the gain of the correction amplifier 20 is not limited to 1, and the gain of the correction amplifier 30 is not limited to 2. The gains of the correction amplifiers 20 and 30 may be changed by changing the resistances of the feedback resistors R4 and R6. The gains of the amplifier 20 and the amplifier 30 may be the same. In this case, it is preferred that each of the correction amplifiers 20 and 30 is provided with the temperature dependent signal Vt and the inverted signal XVt.

In the one embodiment, the OR circuit 40 of the temperature characteristic correction circuit 1 may selectively output one of a plurality of correction signals Vc1 and Vc2 that has the highest voltage value as the adjustment signal Va.

In the one embodiment, the transistors 22 and 32 (FIG. 7), which are coupled to the output terminals of the differential amplifiers 21 and 31, may be replaced by bipolar transistors. In this case, the collectors of the bipolar transistors are coupled to each other through a wired-OR coupling.

Figure 16:
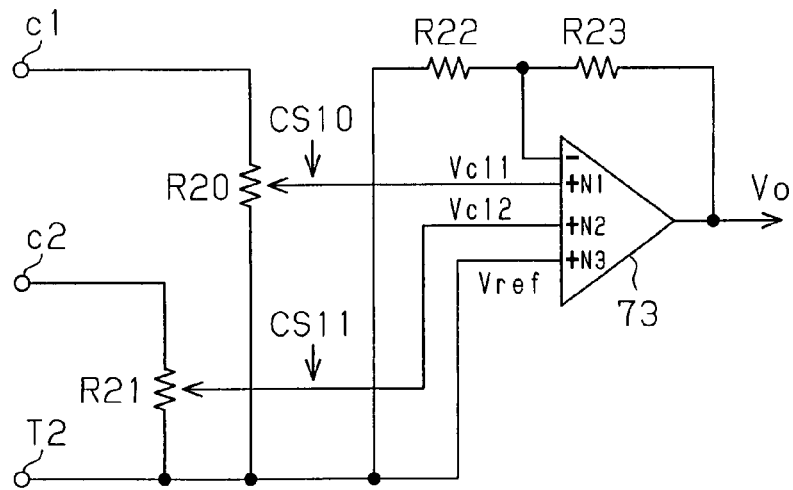
FIG. 16 is a schematic circuit diagram showing a modified structure of a gradient synthesizing amplifier shown in FIG. 9.
Figure 17:
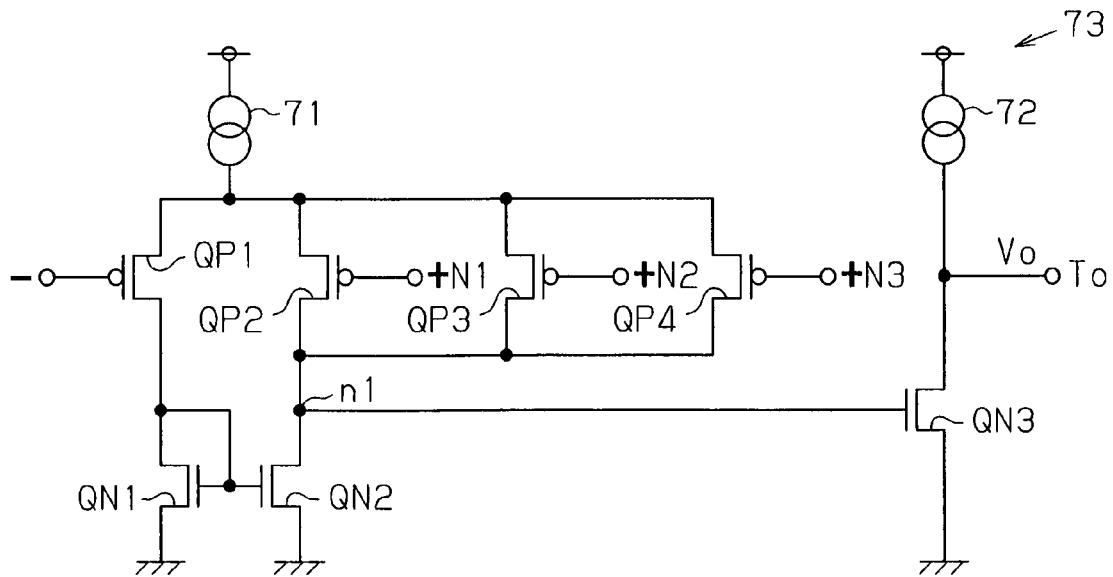
FIG. 17 is a schematic circuit diagram of the gradient synthesizing amplifier of FIG. 16.

In another embodiment, the gradient synthesizing amplifier 70 shown in FIG. 9 may be replaced by a gradient synthesizing amplifier 73 shown in FIG. 16. The gradient synthesizing amplifier 73 includes three or more (three in FIG. 16) non-inversion input terminals N1 to N3. The gradient synthesizing amplifier 73 has a first non-inversion input terminal N1 provided with a first correction signal Vc11, a second non-inversion input terminal N2 provided with a second correction signal Vc12, and a third non-inversion input terminal N3 provided with a reference signal Vref. The reference signal Vref is provided from an input terminal T2. The gradient synthesizing amplifier 73 outputs the one of the first correction signal Vc11, the second correction signal Vc12, and the reference signal Vref that has the lowest voltage value as an output signal Vo. This structure enables the single gradient synthesizing amplifier 73 to synthesize the gradients of the temperature characteristics of three or more voltages (the correction signals Vc11 and Vc12 or the reference signal Vref). Thus, enlargement of the circuit scale can be avoided even when the number of voltages used to generate the output signal Vo increases. FIG. 17 shows an example of the gradient synthesizing amplifier 73. The gradient synthesizing amplifier 73 includes a P-channel MOS transistor QP4, which is coupled in parallel to P-channel MOS transistors QP2 and QP3. The transistor QP4 operates in response to the reference signal Vref.

Figure 18:
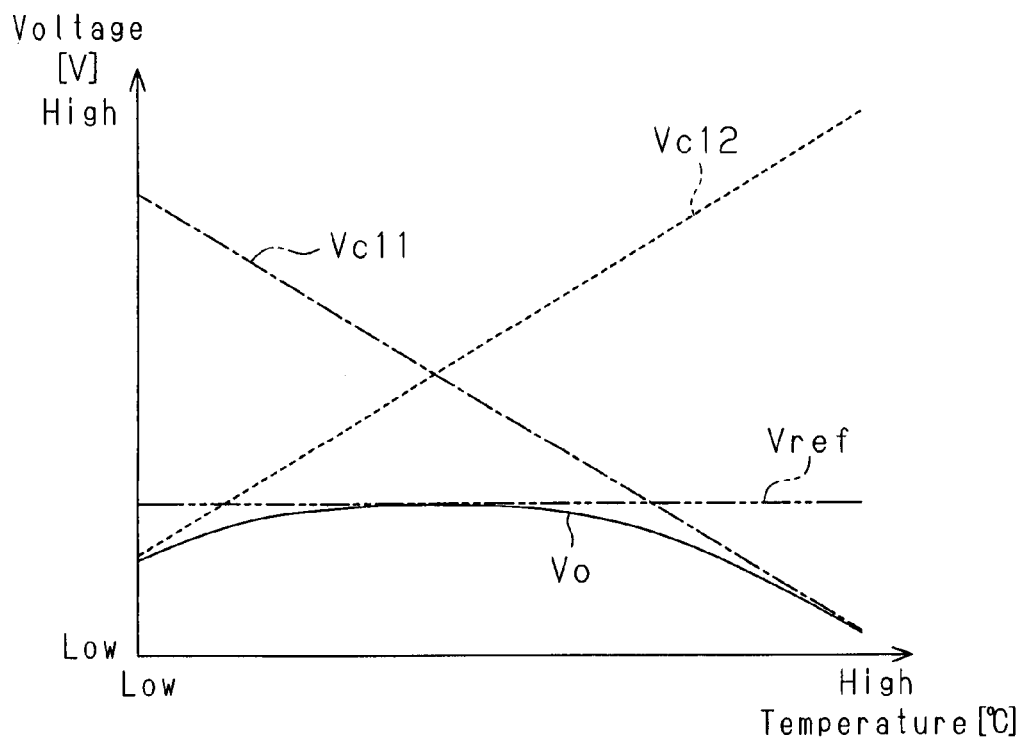
FIG. 18 is a graph showing simulation results of an output signal shown in FIG. 17.

FIG. 18 shows simulation results of the output signal Vo, which is generated by the gradient synthesizing amplifier 73 using the first and second correction signals Vc11 and Vc12 shown in FIG. 11 and the reference signal Vref shown in FIG. 5. As apparent from in FIG. 18, the output signal Vo having complicated temperature characteristics can may be generated by providing more signals to the gradient synthesizing amplifier 73 (three signals in the FIG. 18). This improves the degree of freedom of the temperature characteristics of the output signal Vo (adjustment signal Va).

In another embodiment, the voltage generation unit for generating a plurality of signals (the first and second correction signals Vc11 and Vc12) may include a non-inversion amplification circuit that is formed by a gradient synthesizing amplifier. Further, in another embodiment, the gradient synthesizing amplifier 70 may be replaced by an amplifier that outputs the one of the correction signals Vc11 and Vc12 that has the higher voltage as the output signal Vo.

Figure 19:
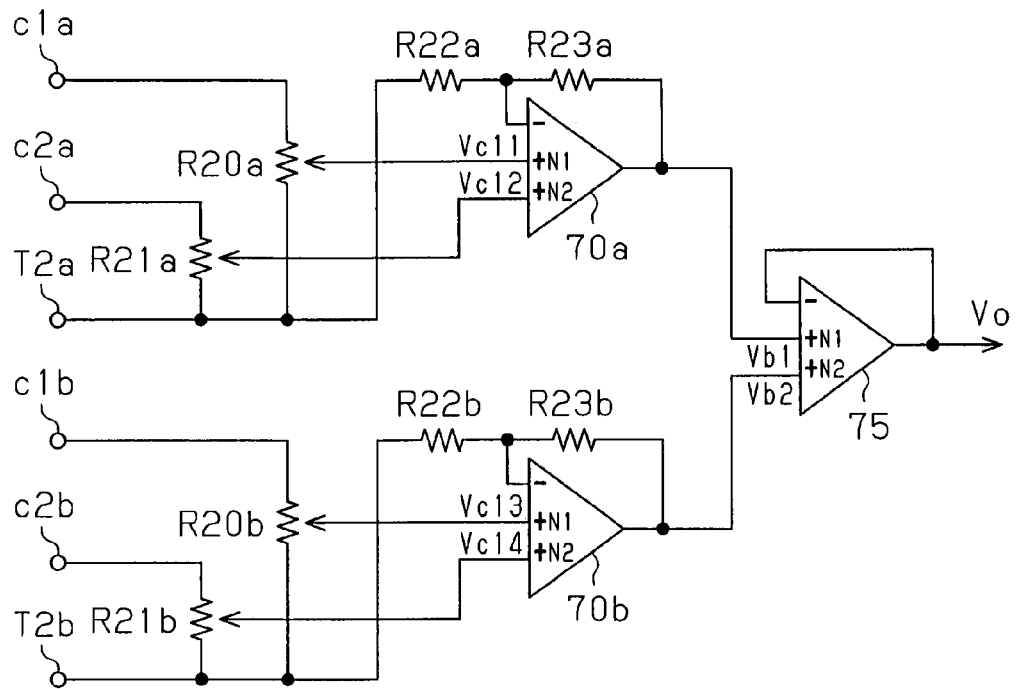
FIG. 19 is a schematic circuit diagram showing a modified structure of the temperature characteristic correction circuit of FIG. 9.
Figure 20:
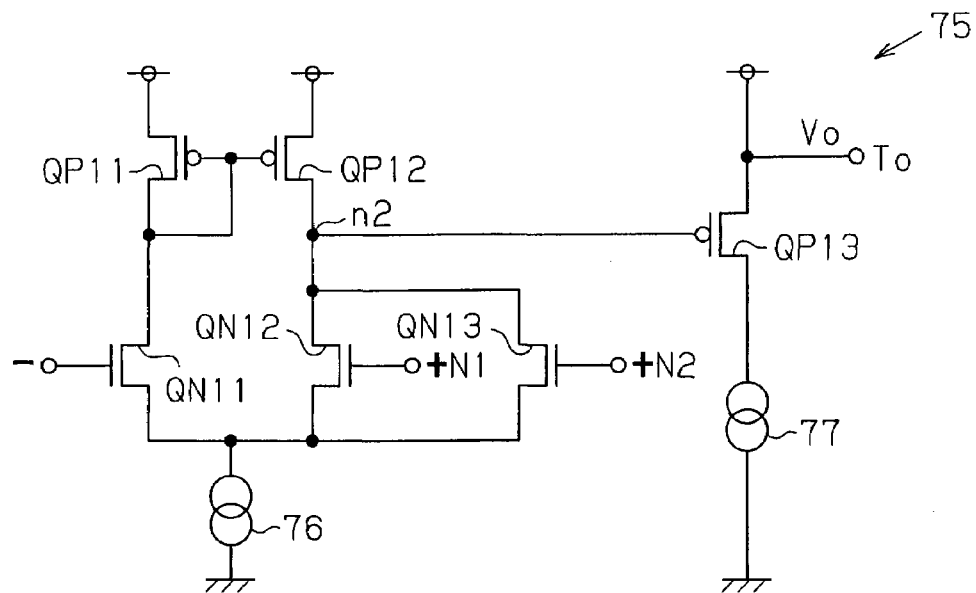
FIG. 20 is a schematic circuit diagram of a gradient synthesizing amplifier shown in FIG. 19.

For example, a temperature characteristic correction signal shown in FIG. 19 includes a voltage generation unit and an amplifier 75. The voltage generation unit includes variable resistors R20a, R21a, R20b, and R21b, input resistors R22a and R22b, feedback resistors R23a and R23b, and amplifiers 70a and 70b. The amplifier 75 functions as a first non-inversion amplification circuit. The input resistor R22a, the feedback resistor R23a, and the amplifier 70a form a second non-inversion amplification circuit. The second non-inversion amplification circuit generates a synthesized signal Vb1 (correction signal) based on first and second correction signals Vc11 and Vc12 (refer to FIG. 21A). Further, the input resistor R22b, the feedback resistor R23b, and the amplifier 70b form a third non-inversion amplification circuit. The third non-inversion amplification circuit generates a synthesized signal Vb2 (correction signal) based on third and fourth correction signals Vc13 and Vc14 (refer to FIG. 21B). Each of the amplifiers 70a and 70b has the same structure as the gradient synthesizing amplifier 70 shown in FIG. 10. Further, the gradient synthesizing amplifier 75 receives the synthesized signals Vb1 and Vb2 provided to its non-inversion input terminal N1 and N2 to output the one of the synthesized signals Vb1 and Vb2 that has the higher voltage value as the output signal Vo. FIG. 20 shows an example of the gradient synthesizing amplifier 75.

The gradient synthesizing amplifier 75 shown in FIG. 20 includes P-channel MOS transistors and N-channel MOS transistors that respectively replace the N-channel MOS transistors and the P-channel MOS transistors of the gradient synthesizing amplifier 70 shown in FIG. 10. More specifically, the gradient synthesizing amplifier 75 includes N-channel MOS transistors QN11, QN12, and QN13 of which sources are coupled to a current source 76. The gates of the MOS transistors QN11, QN12, and QN13 are respectively coupled to an inversion input terminal, a first non-inversion input terminal N1, and a second non-inversion input terminal N2 of the gradient synthesizing amplifier 75. The drain of the MOS transistor QN11 is coupled to the drain of the P-channel MOS transistor QP11 and the gates of the P-channel MOS transistors QP11 and QP12. The drains of the MOS transistors QN12 and QN13 are coupled to the drain of the P-channel MOS transistor QP12.

A node n2 between the MOS transistors QN12 and QN13 and a MOS transistor QP12 is coupled to the gate of the P-channel MOS transistor QP13. The drain of the MOS transistor QP13 is coupled to a current source 77, and a source of the MOS transistor QP13 is coupled to an output terminal To, from which the output signal Vo is output.

Figure 21A:
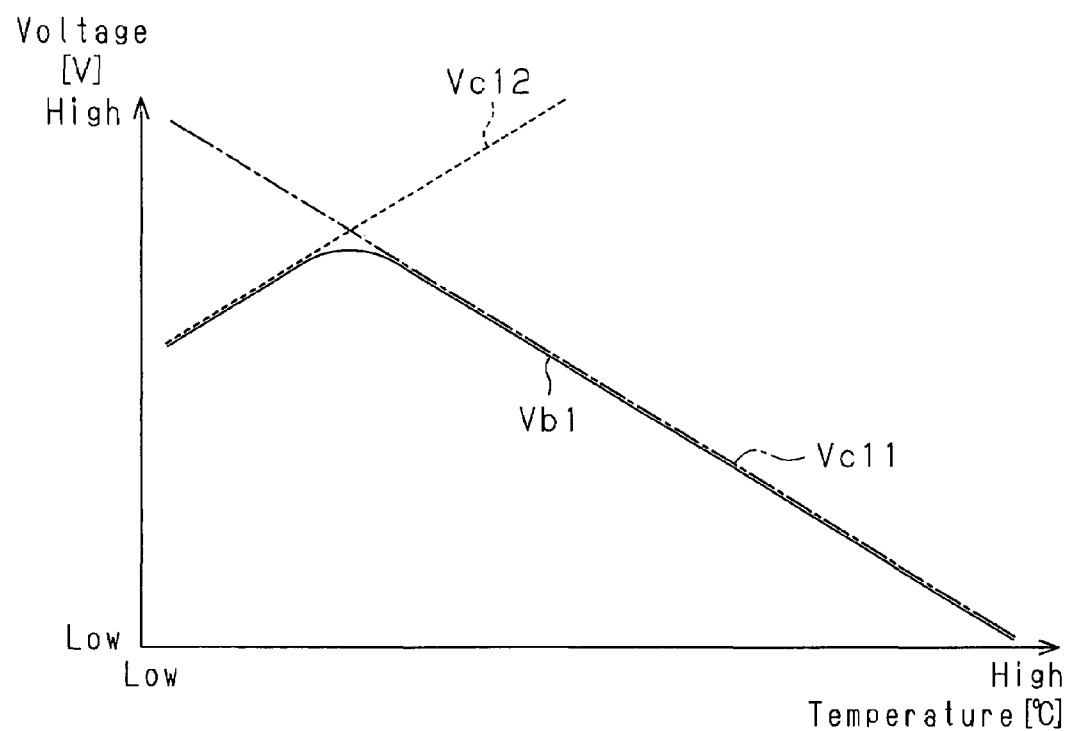
FIG. 21A is a graph showing simulation results of a first synthesized signal shown in FIG. 20.
Figure 21B:
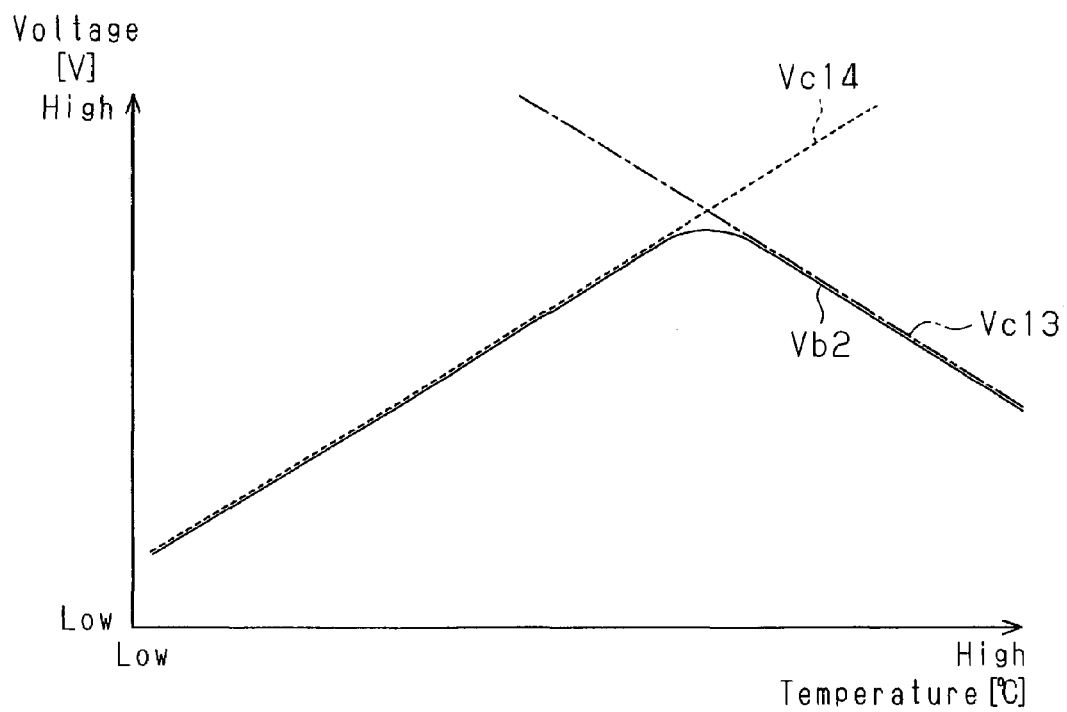
FIG. 21B is a graph showing simulation results of a second synthesized signal shown in FIG. 20.

FIG. 21A shows simulation results of the first synthesized signal Vb1 (refer to the solid line), which is generated by the gradient synthesizing amplifier 70a using the first correction signal Vc11 (dashed line) and the second correction signal Vc12 (broken line). FIG. 21B shows simulation results of the second synthesized signal Vb2 (refer to the solid line), which is generated by the gradient synthesizing amplifier 70b using the third correction signal Vc13 (dashed line) and the fourth correction signal Vc14 (broken line). As apparent from FIGS. 21A and 21B, the gradient synthesizing amplifier 70a constantly outputs the one of the two correction signals Vc11 and Vc12 that has the lower voltage value as the first synthesized signal Vb1 and constantly outputs the one of the two correction signals Vc13 and Vc14 that has the lower voltage value as the second synthesized signal Vb2.

Figure 22:
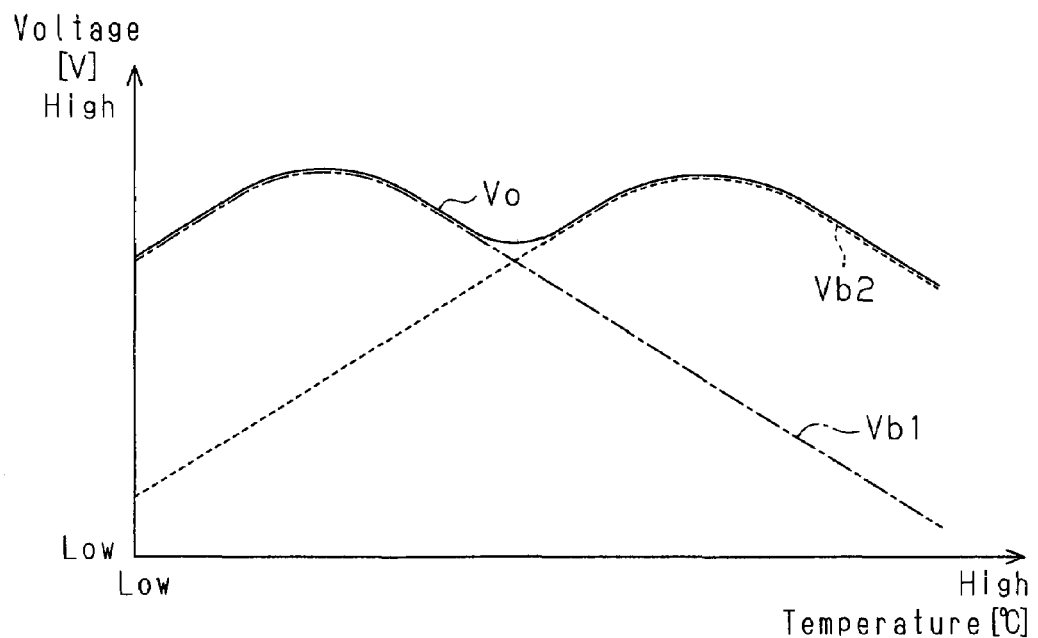
FIG. 22 is a graph showing simulation results of a synthesized signal shown in FIG. 20.

FIG. 22 shows simulation results of the output signal Vo, which is generated by the gradient synthesizing amplifier 75 using the first and second synthesized signals Vb1 and Vb2 shown in FIGS. 21A and 21B. As apparent from FIG. 22, the gradient synthesizing amplifier 75 outputs one of the synthesized signals Vb1 and Vb2 that has the higher voltage value as the output signal Vo. Further, the output signal Vo generated by the gradient synthesizing amplifier 75 smoothly switches from the first synthesized signal Vb1 to the second synthesized signal Vb2. As described above, the amplifier that outputs the one of a plurality of correction signals that has the lowest voltage value and the amplifier that outputs one of a plurality of correction signals that has the highest voltage value are used in combination. This enables the generation of an output signal Vo having further complicated (W-type in FIG. 22) temperature characteristics.

The gradient synthesizing amplifier 75 shown in FIG. 19 may be provided with the first synthesized signal Vb1 and the fourth correction signal Vc14, which are generated by the gradient synthesizing amplifier 70a of the preceding stage. This enables the gradient synthesizing amplifier 75 to generate the output signal Vo having N-type temperature characteristics.

In another embodiment, the gradient synthesizing amplifier 70 may be replaced by the gradient synthesizing amplifier 75 (FIG. 19).

In another embodiment, the non-inversion input terminals N1 and N2 of the gradient synthesizing amplifier 70 may be provided with the temperature dependent voltage Vt and the inversion voltage XVt or the reference voltage Vref.

In another embodiment, the MOS transistors QP1 to QP3 and QN1 to QN3 included in the gradient synthesizing amplifier 70 may be replaced by bipolar transistors.

In another embodiment, the variable resistors R20 and R21 may be replaced by voltage dividing resistors that have fixed resistances.

In the aforementioned embodiments, the temperature dependent signal Vt may have, for example, curved temperature characteristics.

In the aforementioned embodiments, the voltage value of the reference signal Vref may be dependent on the temperature in the same manner as the temperature dependent signal Vt.

In the aforementioned embodiments, the gain of the inversion amplification circuit that is formed by the amplifier 10 and the gain of the inversion amplification circuit that is formed by the amplifier 50 is not limited to 1. The gains of the inversion amplification circuits (10 and 50) may be adjusted by adjusting the resistances of the feedback resistors R2 and R8.

In the aforementioned embodiments, the switch SW3 may be eliminated. In this case, for example, the output signal Vo may be constantly output as the adjustment signal Va. The inversion amplification circuit formed by the amplifier 50 may be eliminated accordingly.

In the aforementioned embodiments, the switches SW1 and SW2 may be eliminated. In this case, for example, the temperature dependent signal Vt may be constantly input into the inversion input terminals of the correction amplifiers 20 and 30. In this case, the inversion amplification circuit 10 may be eliminated accordingly.

Figure 23:
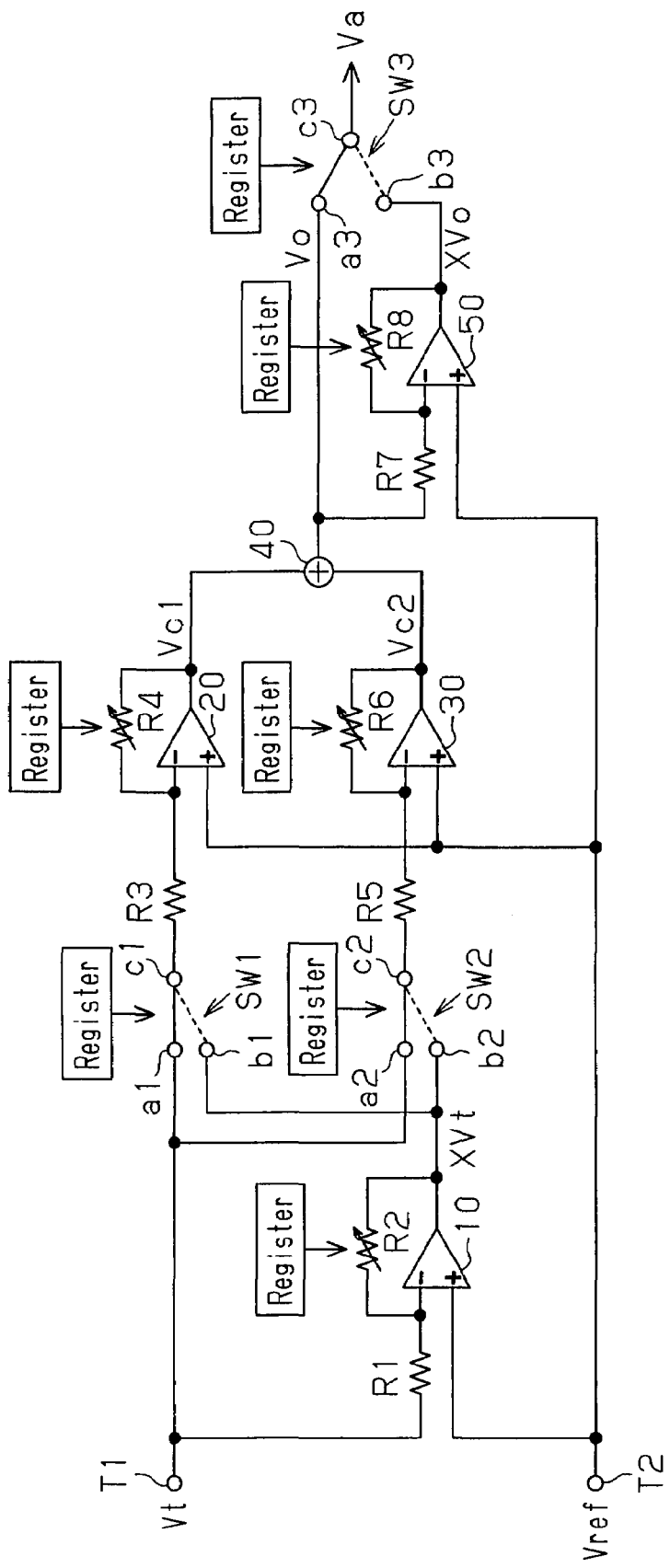
FIG. 23 is a schematic circuit diagram showing a modified structure of the temperature characteristic correction circuit of FIG. 4.

In the aforementioned embodiments, the method for setting the resistances of the feedback resistors R2, R4, R6, and R8 and the variable resistors R20 and R21 and the method for switching the switches SW1 to SW3 may be changed. For example, as shown in FIG. 23, registers may be coupled to the switches SW1 to SW3 of the feedback resistors R2, R4, R6, and R8, and the resistances of the feedback resistors R2, R4, R6, and R8 may be set and the switches may be switched based on the setting stored in each register. In this case, it is preferred that the set values are selected based on the temperature characteristics of the output signal Vs.

In the aforementioned embodiments, the first and second correction signals Vc1 and Vc2 do not have to be generated with the temperature dependent signal Vt and the reference signal Vref. The first and second correction signals Vc1 and Vc2 are only required to be generated in a manner that the voltages of the signals change at rates differing from each other and become the same at a predetermined temperature.

The present examples and embodiments are to be considered as illustrative and not restrictive, and the invention is not to be limited to the details given herein, but may be modified within the scope and equivalence of the appended claims.

What is claimed is:

1. A temperature characteristic correction circuit correcting a temperature characteristic of a signal, the temperature characteristic correction circuit comprising:
   a plurality of correction signal generation units generating a plurality of correction signals characterized by different temperature to voltage change rates,
   wherein the plurality of correction signals having the lowest voltage or the one of the plurality of correction signals having the highest voltage is generated as an adjustment signal correcting the temperature characteristic of the signal at a given temperature by the one of the plurality of correction signal generation units.

2. The temperature characteristic correction circuit according to claim 1, wherein the plurality of correction signal generation units include:
   a first correction signal generation unit having a first amplifier generating a first correction signal based on a first temperature dependent signal having a voltage dependent on temperature and a first reference signal having a voltage independent from temperature; and
   a second correction signal generation unit having a second amplifier generating a second correction signal based on the first temperature dependent signal and the first reference signal; wherein
   the first amplifier includes a first output terminal outputting the first correction signal; and
   the second amplifier includes a second output terminal outputting the second correction signal, with the first and second output terminals being coupled to each other.

3. The temperature characteristic correction circuit according to claim 2, wherein the first and second amplifiers each include:
   a differential amplifier amplifying a voltage difference between the first temperature dependent signal and the first reference signal and generating an amplified signal; and
   a transistor having a gate responsive to the amplified signal, a source, and a drain, with the drain of the transistor of the first amplifier and the drain of the transistor of the second amplifier being coupled to each other.

4. The temperature characteristic correction circuit according to claim 2, further comprising:
   a first feedback resistor coupled to the first amplifier and formed by a variable resistor; and
   a second feedback resistor coupled to the second amplifier and formed by a variable resistor.

5. The temperature characteristic correction circuit according to claim 4, wherein the first and second feedback resistors each have a resistance that is in accordance with the temperature characteristic of the signal that is to be corrected.

6. The temperature characteristic correction circuit according to claim 2, further comprising:
   an inversion amplification circuit, operably coupled to the first and second amplifiers, inverting the first temperature dependent signal based on the first reference signal to generate an inverted signal;
   wherein the first and second amplifiers each selectively receive the first temperature dependent signal and the inverted signal in accordance with the temperature characteristic of the signal that is to be corrected.

7. The temperature characteristic correction circuit according to claim 6, further comprising:
   a third feedback resistor coupled to the inversion amplification circuit and formed by a variable resistor, wherein the third feedback resistor has a resistance determined in accordance with the temperature characteristic of the signal that is to be corrected.

8. The temperature characteristic correction circuit according to claim 1, wherein the plurality of correction signal generation units include:
   a first correction signal generation unit having a first amplifier generating a first correction signal based on a first temperature dependent signal having a voltage dependent on temperature and a first reference signal having a voltage independent from temperature; and
   a second correction signal generation unit having a second amplifier generating a second correction signal based on a second temperature dependent signal having a voltage dependent on temperature and a second reference signal having a voltage independent from temperature;
   the first amplifier including a first output terminal outputting the first correction signal; and
   the second amplifier including a second output terminal outputting the second correction signal, with the first and second output terminals being coupled to each other.

9. The temperature characteristic correction circuit according to claim 8, wherein:
   the first temperature dependent signal has a linear temperature characteristic; and
   the second temperature dependent signal has a curved temperature characteristic.

10. The temperature characteristic correction circuit according to claim 1, wherein the plurality of correction signals include:
    a first correction signal characterized by a first temperature characteristic represented by a first curve; and
    a second correction signal characterized by a second temperature characteristic represented by a second curve, with the first curve and the second curve intersecting each other at one point or more.

11. A sensor amplification circuit coupling to a sensor generating a signal having a predetermined temperature characteristic and to a temperature characteristic correction circuit correcting the temperature characteristic of the signal, wherein the temperature characteristic correction circuit includes a plurality of correction signal generation units generating a plurality of correction signals characterized by different temperature to voltage change rates, in which the one of the plurality of correction signals having the lowest voltage or the one of the plurality of correction signals having the highest voltage is generated as an adjustment signal correcting the temperature characteristic of the signal at a given temperature, the sensor amplification circuit comprising:
    an amplifier correcting the temperature characteristic of the signal generated by the sensor with the adjustment signal generated by the temperature characteristic correction circuit and amplifying the corrected signal.

12. A temperature characteristic correction circuit correcting a temperature characteristic of a signal, the temperature characteristic correction circuit comprising:
    a voltage generation unit generating a plurality of correction signals characterized by different temperature to voltage change rates; and
    a non-inversion amplification circuit, coupled to the voltage generation unit, generating the one of the plurality of correction signals having the lowest voltage or the one of the plurality of correction signals having the highest voltage as an adjustment signal correcting the temperature characteristic of the signal at a given temperature.

13. The temperature characteristic correction circuit according to claim 12, wherein the non-inversion amplification circuit has a gain of 1.

14. The temperature characteristic correction circuit according to claim 12, wherein the non-inversion amplification circuit is an amplifier having an inversion input terminal and a plurality of non-inversion input terminals, which respectively receive the plurality of correction signals, with the amplifier including a differential pair formed by a first transistor coupled to the inversion input terminal and a plurality of second transistors respectively coupled to the plurality of non-inversion input terminals, and the plurality of second transistors being coupled in parallel.

15. The temperature characteristic correction circuit according to claim 12, wherein the voltage generation unit includes a plurality of variable resistors, each having a resistance that is in accordance with a temperature dependent signal having a voltage dependent on temperature, and the plurality of correction signals are based on the resistances of the plurality of variable resistors respectively.

16. The temperature characteristic correction circuit according to claim 14, wherein the voltage generation unit includes a plurality of variable resistors respectively coupled to the plurality of non-inversion input terminals of the amplifier and having resistances that are in accordance with a temperature dependent signal having a voltage dependent on temperature, and the plurality of correction signals are based on the resistances of the plurality of variable resistors respectively.

17. The temperature characteristic correction circuit according to claim 12, wherein the voltage generation unit includes:
    an inversion amplification circuit inverting a temperature dependent signal having a voltage dependent on temperature based on a reference signal having a voltage independent from temperature to generate an inverted signal; and
    a plurality of variable resistors, each having a resistance that is in accordance with the temperature dependent signal or the inverted signal, with the plurality of correction signals being based on the resistances of the plurality of variable resistors respectively.

18. The temperature characteristic correction circuit according to claim 12, wherein the voltage generation unit includes:
    an inversion amplification circuit inverting a temperature dependent signal having a voltage dependent on temperature based on a reference signal having a voltage independent from temperature to generate an inverted signal, with the non-inversion amplification circuit receiving the temperature dependent signal or the inverted signal as one of the plurality of correction signals.

19. The temperature characteristic correction circuit according to claim 12, wherein the non-inversion amplification circuit receives the plurality of correction signals and a reference signal independent from temperature and generates the one of the plurality of correction signals and the reference signal having the lowest voltage or the highest voltage as the adjustment signal at a given temperature.

20. The temperature characteristic correction circuit according to claim 12, wherein the voltage generation unit includes a second non-inversion amplification circuit receiving a plurality of second correction signals characterized by different temperature to voltage change rates and generating the one of the plurality of second correction signals having the lowest voltage or the highest voltage as one of the plurality of correction signals at a given temperature.

* * * * *

UNITED STATES PATENT AND TRADEMARK OFFICE
CERTIFICATE OF CORRECTION

PATENT NO.        : 7,625,118 B2
APPLICATION NO.   : 11/902798
DATED             : December 1, 2009
INVENTOR(S)       : Nobuyasu Mizuno It is certified that error appears in the above-identified patent and that said Letters Patent is hereby corrected as shown below:

On Title Page-

Item (73) Assignee Information, please correct to read as follows:

-- (73)   Assignee: --Fujitsu Microelectronics Limited, Tokyo (JP) --

Signed and Sealed this

Ninth Day of November, 2010

David J. Kappos
*Director of the United States Patent and Trademark Office*